(12) United States Patent
Hasharoni

(10) Patent No.: US 10,447,407 B2
(45) Date of Patent: Oct. 15, 2019

(54) HIGH-FREQUENCY OPTOELECTRONIC MODULE

(71) Applicant: DustPhotonics Ltd., Modiin Illit (IL)

(72) Inventor: Jacob Hasharoni, Srigim (IL)

(73) Assignee: DUST PHOTONICS LTD., Modiin (IL)

( * ) Notice: Subject to any disclaimer, the term of this patent is extended or adjusted under 35 U.S.C. 154(b) by 0 days.

(21) Appl. No.: 15/663,854

(22) Filed: Jul. 31, 2017

(65) Prior Publication Data
US 2019/0036618 A1    Jan. 31, 2019

(51) Int. Cl.
| | |
|---|---|
| *H04B 10/00* | (2013.01) |
| *H04B 10/80* | (2013.01) |
| *G02B 6/42* | (2006.01) |
| *H04B 10/25* | (2013.01) |

(52) U.S. Cl.
CPC ......... *H04B 10/801* (2013.01); *G02B 6/4279* (2013.01); *H04B 10/2504* (2013.01)

(58) Field of Classification Search
CPC ....... H01L 25/167; G02B 6/4201; G02B 6/43; G02B 6/428; G02B 6/42; G02B 6/4279; H04B 10/801; H04B 10/2504
USPC ........................................................ 398/116
See application file for complete search history.

(56) References Cited

U.S. PATENT DOCUMENTS

| | | | | |
|---|---|---|---|---|
| 2009/0202197 A1* | 8/2009 | Heinz-Gunter | .... | G02B 6/12004 385/14 |
| 2012/0251033 A1* | 10/2012 | Matsuoka | ............ | G02B 6/4259 385/8 |
| 2017/0131494 A1* | 5/2017 | Hsieh | .................... | G02B 6/4246 |
| 2018/0059339 A1* | 3/2018 | Gupta | .................... | G02B 6/425 |

* cited by examiner

*Primary Examiner* — Don N Vo
(74) *Attorney, Agent, or Firm* — Reches Patents

(57) ABSTRACT

A high-frequency optoelectronic module, that includes a first chip, a substrate and at least one optoelectronic unit. The first chip includes a set of high-frequency electrical IO interfaces. The at least one optoelectronic unit includes a group of high-frequency electrical IO interfaces and a group of high-frequency optical IO interfaces. The group of high-frequency optical IO interfaces is coupled to the group of high-frequency electrical IO interfaces. The substrate is coupled to the first chip and the at least one optoelectronic chip. The set of high-frequency electrical IO interfaces is coupled to the group of high-frequency electrical IO interfaces via a group of conductors. A length of each conductor of the group of conductors is of a scale that does not exceed a millimetric scale. The at least one optoelectronic circuit is configured to (a) convert high-frequency output electrical signals from the first chip to high-frequency output optical signals, and (b) convert high-frequency input optical signals sent towards the first chip to high-frequency input electrical signals. The high-frequency it not smaller than one hundred gigabits per second.

18 Claims, 18 Drawing Sheets

HIGH-FREQUENCY OPTOELECTRONIC MODULE

BACKGROUND

The ever-growing increase in global internet traffic imposes significant challenges on data center operators. An almost exponential growth is found for both intra- and inter-data center traffic originating from the continuous growth of cloud-based applications, social media and big data analytics. Modern data centers utilize hundreds of thousands of servers which require an efficient interconnection network which is both low-cost and energy-efficient.

Network topology requires that all server nodes are connected to each one via a set of switches arranged in several hierarchy layers. Since the network is designed as a non-blocking Clos network, the number of switch ports must be large enough to support the entire data center traffic without any congestion created.

As a result, the bandwidth of switches deployed doubles itself every 2-3 years with 12.8 Tera-bits per second (Tb/s) being the largest bandwidth in use today and 25.6 Tb/s scheduled to arrive by 2020.

The number of input/output (IO) ports on these large switch application specific integrated circuits (ASICs) is limited by package and printed circuit board (PCB) design rules, with 256 ports being the upper limit, so far. Thus, to comply with the need for more bandwidth, the line rate of these ports has been constantly rising: 3.2 Tb/s switch using 128 ports running at 25 Giga-bits per second (Gb/s); 6.4 T switch using 256 ports at 25 Gb/s and 12.8 T switch using 256 ports at 50 Gb/s.

With 25.6 T switches, there will be 256 ports running at 100 Gb/s (50 G Baud, four-level pulse amplitude modulation (PAM4)).

FIG. 1 illustrates a prior art line card 1.

Switch 2 is mounted on a line card 1 is connected via its IO ports to the front panel optical transceivers 4 using metal traces 5 in the PCB. Transceiver 4 converts the electronic signal to an optical signal coupled into fiber optic link 6.

The loss increases with the line rate and at 100 Gb/s amounts to about 25 dB per link. This loss needs to be overcome by a serializer-deserializer (SerDes) interface on the switch 2 to enable traffic flow.

However, the power consumption of such a SerDes interface is in the order of 1 W/100G using advanced CMOS nodes with a 20-30% drop expected with further scaling of the process node.

With a 256 SerDes interface array in the switch ASIC, the chip IO power amounts to 180-250 W. This is almost 50% of the total ASIC power implying that the switch capacity is seriously reduced compared to the amount of logic processing that could be carried out.

A second limitation is associated with the power dissipation of the 4×100 G front panel transceiver 4 that performs an e/o conversion of the highly attenuated and distorted 100 G signal.

A customized DSP is required to filter the incoming signal using a multi-tap DFE equalizer. This step comes at additional power dissipation of about 1 W per transceiver and with 32 devices on the front panel, the total power dissipation on traffic flow in system 1 exceeds 280 W

SUMMARY OF THE INVENTION

There may be provided a high-frequency optoelectronic module that may include (a) a first chip that may include a set of high-frequency electrical input/output (IO) interfaces; (b) at least one optoelectronic unit that may include a group of high-frequency electrical IO interfaces and a group of high-frequency optical IO interfaces; wherein the group of high-frequency optical IO interfaces may be coupled to the group of high-frequency electrical IO interfaces; (c) a substrate that may be coupled to the first chip and the at least one optoelectronic chip. The set of high-frequency electrical IO interfaces may be coupled to the group of high-frequency electrical IO interfaces via a group of conductors; wherein a length of each conductor of the group of conductors may be of a scale that does not exceed a millimetric scale. The at least one optoelectronic circuit may be configured to (a) convert high-frequency output electrical signals from the first chip to high-frequency output optical signals, and (b) convert high-frequency input optical signals sent towards the first chip to high-frequency input electrical signals. The high-frequency not smaller than one hundred gigabits per second.

The at least one conductor of the group of conductors may pass through the substrate.

The substrate may be coupled to the group of high-frequency electrical IO interfaces via a group of conducting elements; wherein the substrate may be coupled to the set of high-frequency electrical IO interfaces via a set of conducting elements; wherein the group of conducting elements and the set of conducting elements are positioned at a same plane.

The substrate may be coupled to the group of high-frequency electrical IO interfaces via a group of conducting elements; wherein the substrate may be coupled to the set of high-frequency electrical IO interfaces via a set of conducting elements; wherein a minimal distance between a conducting element of the group of conducting elements and a conducting element of the set of conducting elements may be of a scale that does not exceed a millimetric scale.

The at least one optoelectronic unit may include optoelectronic chips, the optoelectronic units groups of high-frequency electrical IO interfaces and groups of high-frequency optical IO interfaces; wherein the first chip may include sets of high-frequency electrical input/output interfaces; wherein the sets of high-frequency electrical input/output interfaces are coupled to the groups of high-frequency electrical IO interfaces via multiple groups of conductors; wherein a length of each conductor of the multiple group of conductors may be of a scale that does not exceed a millimetric scale.

The optoelectronic units may surround the first chip.

The group of high-frequency optical IO interfaces may include Silicon Photonics circuitry.

The group of high-frequency optical IO interfaces may include optical cells that are configured to operate at a same wavelength.

The group of high-frequency optical IO interfaces may include sets of optical cells, wherein optical cells of a same set optical cell operate at the same wavelength, wherein at least two different sets of optical sets operate at different wavelengths.

The group of high-frequency optical IO interfaces may include optical cells that operate at single mode.

The group of high-frequency optical IO interfaces may include optical cells that operate at multimode.

The group of high-frequency optical IO interfaces may include one or arrays of transmit optical cells and one or more arrays of receive optical cells.

The at least one optoelectronic unit may include analog circuitry for receiving the high-frequency output electrical signals from the first chip, for manipulating the high-frequency output electrical signals in the analog domain and for providing manipulated high-frequency output electrical signals to an optical circuitry.

The at least one optoelectronic unit may include a deserializer, analog to digital conversion unit, a digital processor, a digital to analog conversion unit, a serializer, and optical circuitry; wherein the deserializer may be configured to convert a stream of high-frequency output electrical signals to multiple streams of electrical signals of an intermediate frequency that may be lower than a high-frequency of the stream of high-frequency output electrical signals; wherein the analog to digital conversion unit may be configured to convert the multiple streams of electrical signals of an intermediate frequency to multiple streams of digital signals; wherein the digital processor may be configured to digitally process the multiple streams of digital signals to provide multiple streams of digitally processed signals; wherein the digital to analog conversion unit may be configured to convert the multiple streams of digitally processed signals to multiple streams of analog signals; wherein the serializer may be configured to convert the analog signals to a stream of high-frequency analog signals; wherein the optical circuitry may be configured to convert the stream of high-frequency analog signals to a stream of high-frequency optical signals.

The at least one substrate may include an organic substrate.

The at least one substrate may include a non-organic substrate.

There may be provided a method for operating any of the high-frequency optoelectronic module illustrated in the specification.

There may be provided a method for exchanging signals with a high-frequency optoelectronic module, the method may include receiving, by at least one optoelectronic circuit of the high-frequency optoelectronic module, high-frequency output electrical signals from a first chip of the high-frequency optoelectronic module; converting, by the at least one optoelectronic circuit, the high-frequency output electrical signals to high-frequency output optical signals; outputting by the by the at least one optoelectronic circuit, the high-frequency output optical signals; receiving, by at least one optoelectronic circuit of the high-frequency optoelectronic module, high-frequency input optical signals sent towards the first chip; converting, by the at least one optoelectronic circuit, the high-frequency input optical signals to high-frequency input electrical signals; and outputting to the first chip, by the by the at least one optoelectronic circuit, the high-frequency input electrical signals. The first chip may include a set of high-frequency electrical input/output (IO) interfaces. The at least one optoelectronic unit comprises a group of high-frequency electrical IO interfaces and a group of high-frequency optical IO interfaces. The group of high-frequency optical IO interfaces is coupled to the group of high-frequency electrical IO interfaces; wherein the high-frequency optoelectronic module comprises a substrate that is coupled to the first chip and the at least one optoelectronic chip; wherein the set of high-frequency electrical IO interfaces is coupled to the group of high-frequency electrical IO interfaces via a group of conductors; wherein a length of each conductor of the group of conductors is of a scale that does not exceed a millimetric scale; wherein the high-frequency it not smaller than one hundred gigabits per second. Any exchange of signals between the set of high-frequency electrical IO interfaces and the group of high-frequency electrical IO interfaces can be done via the group of conductors. Any conductor may be used for bi-directional and/or unidirectional communication.

The method may include receiving, by analog circuitry of the at least one optoelectronic circuit, the high-frequency output electrical signals; manipulating, by the analog circuitry, the high-frequency output electrical signals in the analog domain to provide manipulated high-frequency output electrical signals; providing, by the analog circuitry, the manipulated high-frequency output electrical signals to an optical circuitry of by the at least one optoelectronic circuit; and outputting, by the optical circuitry, the high-frequency output optical signals in response to the manipulated high-frequency output electrical signals.

The at least one optoelectronic unit may include a deserializer, analog to digital conversion unit, a digital processor, a digital to analog conversion unit, a serializer, and optical circuitry. The method may include converting, by the serializer, a stream of high-frequency output electrical signals to multiple streams of electrical signals of an intermediate frequency that is lower than a high-frequency of the stream of high-frequency output electrical signals; converting, by the analog to digital conversion unit, the multiple streams of electrical signals of an intermediate frequency to multiple streams of digital signals; processing, by the digital processor, the multiple streams of digital signals to provide multiple streams of digitally processed signals; converting, by the digital to analog conversion unit, the multiple streams of digitally processed signals to multiple streams of analog signals; converting, by the serializer, the analog signals to a stream of high-frequency analog signals; and converting by the optical circuitry, the stream of high-frequency analog signals to a stream of high-frequency optical signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
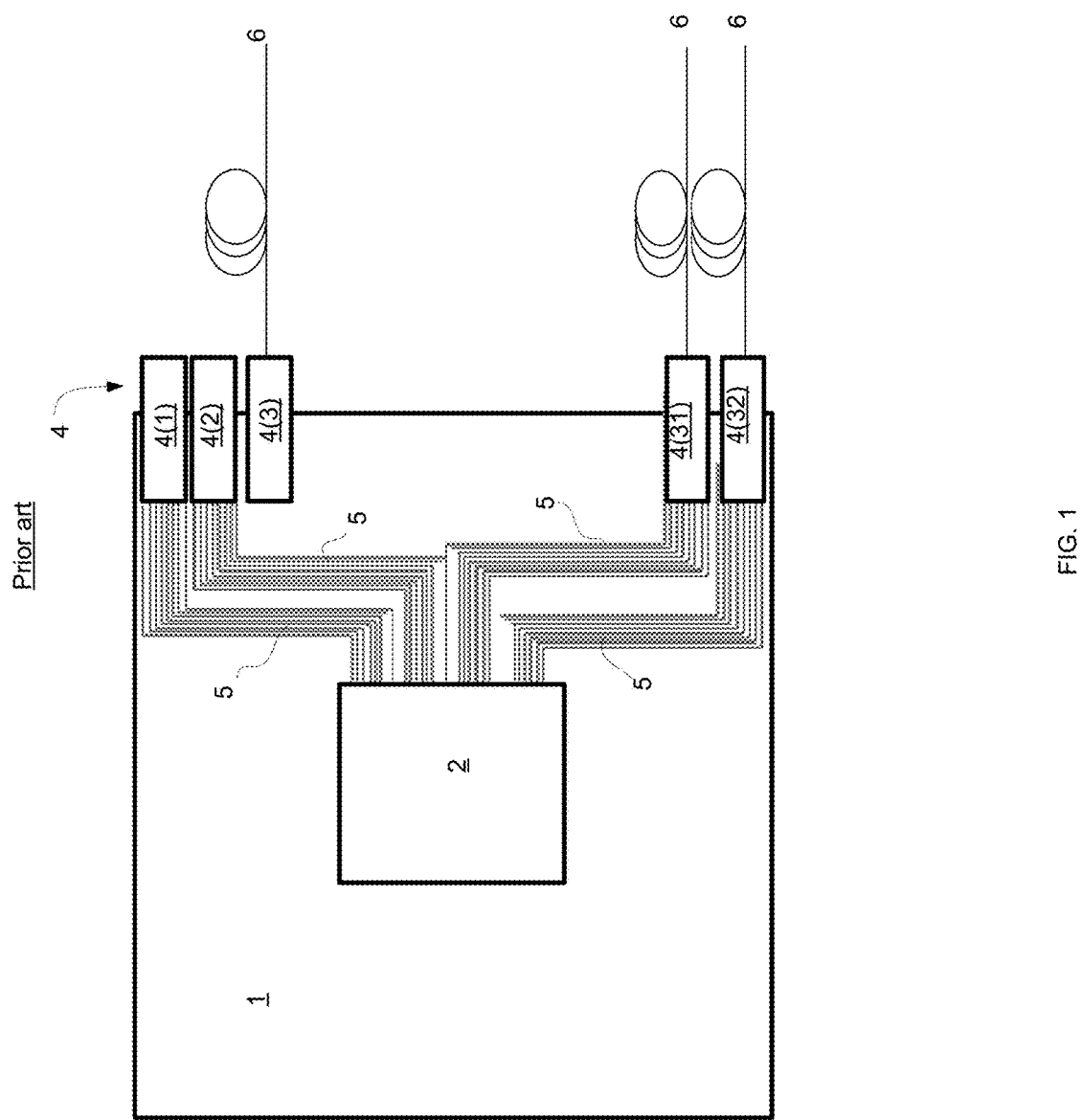
FIG. 1 illustrates a prior art line card.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a module capable of executing the method.

Any reference in the specification to a module should be applied mutatis mutandis to a method that may be executed by the module.

The term "substantially"—unless stated otherwise may refer to a deviation of few percent (for example—deviation of less than ten percent or less than 20 percent).

Any combination of any module, chip, circuit, or component listed in any of the figures, any part of the specification and/or any claims may be provided. Especially any combination of any claimed feature may be provided.

Figure 2:
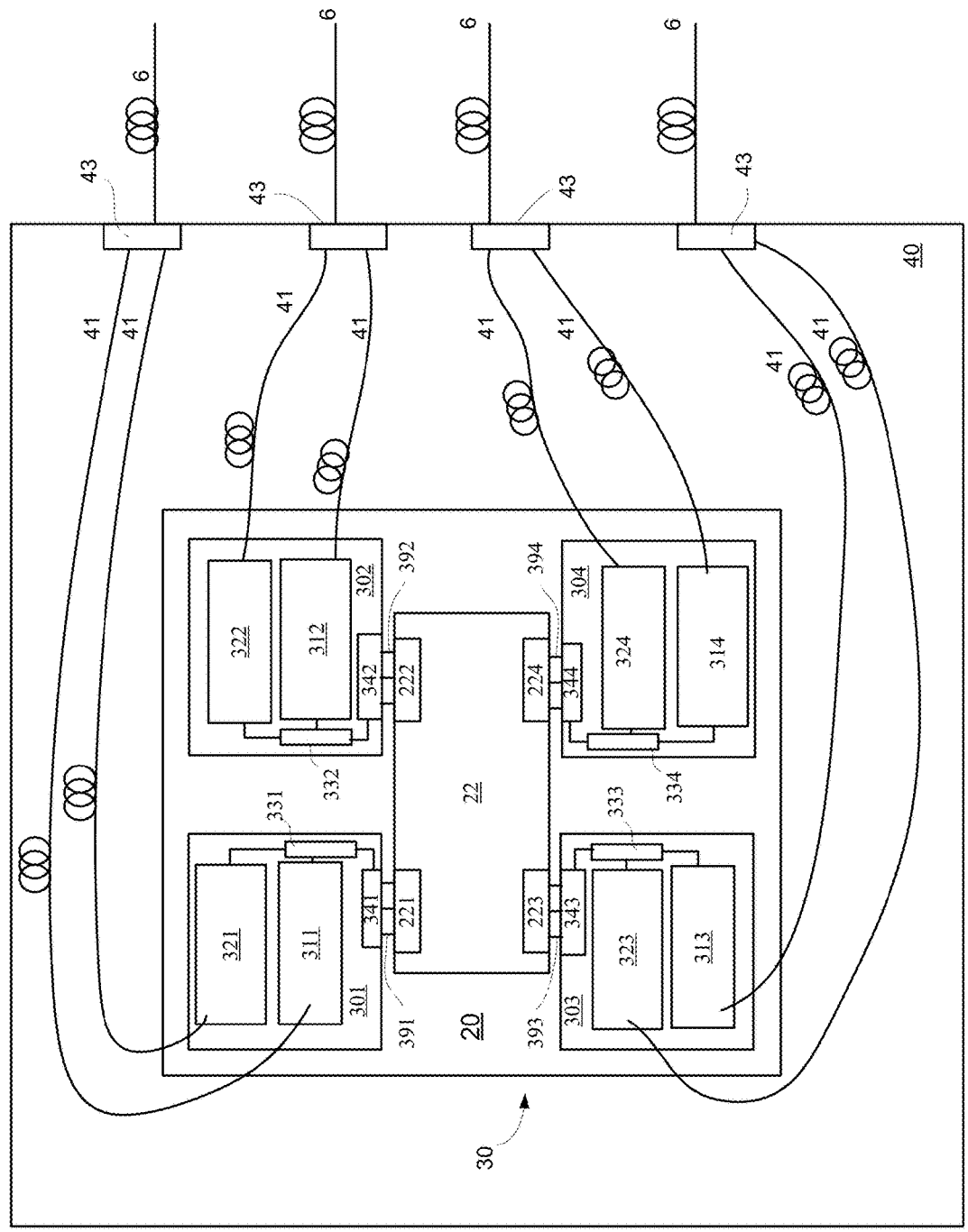
FIG. 2 illustrates an example of a line card.

FIG. 2 illustrates an example of line card 40 and a high-frequency optoelectronic module 30.

The high-frequency optoelectronic module 30 includes a first chip 22, and one or more optoelectronic units—such as optoelectronic units 301, 302, 303 and 304.

Each one of optoelectronic units 301, 302, 303 and 304 may include one or more chips. The one or more chips may include an electrical IO chip and one or more optical IO chips.

The number of first chips may exceed one. The number of optoelectronic units may be one or any integer that exceeds one.

The first chip may be a CMOS chip or may be fabricated by other manufacturing processes. The first chip may be switch, any communication chip, a processor, and the like. For example—it is assumed that the first chip is a high bandwidth ASIC such as a switch, specifically an Ethernet switch. It is noted that the first chip may differ from an ASIC. It may, for example, be a field programmable gate array (FPGA).

The term "first" is used in this context to differentiate between first chip 22 and optoelectronic units 301, 302, 303 and 304.

The first chip 22 includes one or more sets of high-frequency electrical input/output IO interfaces.

A high electrical frequency IO interface is a circuit that is capable to input and/or output high frequency electrical signals. High frequency means at least one hundred Gb/s.

Each one of optoelectronic units 301, 302, 303 and 304 includes a group of high-frequency electrical IO interfaces (341, 342, 343 and 344 respectively) and a group of high-frequency optical IO interfaces. The group of high-frequency electrical IO interfaces may belong to an electrical IO chip while the group of high-frequency optical IO interfaces may belong to one or more optical IO chips such as receive chip and a transmit chip.

A high frequency optical IO interface is a circuit that is capable to input and/or output high frequency optical signals.

The group of high-frequency optical IO interfaces of optoelectronic unit 301 is included in receive chip 321 and in transmit chip 311. The group of high-frequency optical IO interfaces of optoelectronic unit 302 is included in receive chip 322 and in transmit chip 312. The group of high-frequency optical IO interfaces of optoelectronic unit 303 is included in receive chip 323 and in transmit chip 313. The group of high-frequency optical IO interfaces of optoelectronic unit 304 is included in receive chip 324 and in transmit chip 314.

The high-frequency optoelectronic module 30 includes a substrate 20 (such as an organic or an inorganic substrate) that may be coupled to first chip 22 and optoelectronic units 301, 302, 303 and 304.

Group of high-frequency electrical IO interface 341 is electrically coupled (via conductors 391) to set 221 of high-frequency electrical input/output IO interface of first chip 22. Group of high-frequency electrical IO interface 342 is electrically coupled (via conductors 392) to set 222 of high-frequency electrical input/output IO interface of first chip 22. Group of high-frequency electrical IO interface 343 is electrically coupled (via conductors 393) to set 223 of high-frequency electrical input/output IO interface of first chip 22. Group of high-frequency electrical IO interface 344 is electrically coupled (via conductors 394) to set 224 of high-frequency electrical input/output IO interface of first chip 22.

The conductors (391, 392, 393 and 394) are of a scale that does not exceed a millimetric scale. Accordingly—the length of a conductors may not exceed few millimeters (for example—does not exceed 0.5 centimeter, and the like). The conductors may be coupled to connecting elements such as solder bumps that may be of a scale that does not exceed a microscopic scale. For example—solder bumps of about 50 microns diameter may be used.

Because of the very short distance that the high-frequency electrical signals pass between first chip 22 and any of the optoelectronic units—the energy consumption of the chip 22 and of the optoelectronic units—and especially the energy consumption of electrical circuitry (such as but not limited to the SerDes) is greatly reduced and this dramatically reduces the power consumption of the high-frequency optoelectronic module 30.

Conductors 391, 392, 393 and 394 may be made of metal—especially conducting metals—such as copper—or from any other conducting materials.

At least some of the conductors may pass through substrate 20 and/or may otherwise interact with substrate 20.

Optoelectronic units 301, 302, 303 and 304 are configured to interface between the electrical domain and the optical domain. Chip 22 may exchange high-frequency electrical signals with optoelectronic units 301, 302, 303 and 304. Optoelectronic units 301, 302, 303 and 304 may exchange high frequency optical signals with optical components such as fibers 41.

Accordingly, each one of optoelectronic units 301, 302, 303 and 304 may be configured to (a) convert high-frequency output electrical signals from the first chip to high-frequency output optical signals, and (b) convert high-frequency input optical signals sent towards the first chip to high-frequency input electrical signals.

FIG. 2 illustrates that each one of optoelectronic units 301, 302, 303 and 304 includes electrical circuitry.

The electrical circuitry may include the group of high-frequency electrical IO interfaces (341, 342, 343 and 344 respectively) and may include additional circuitry such as 331, 332, 333 and 334.

Figure 7:
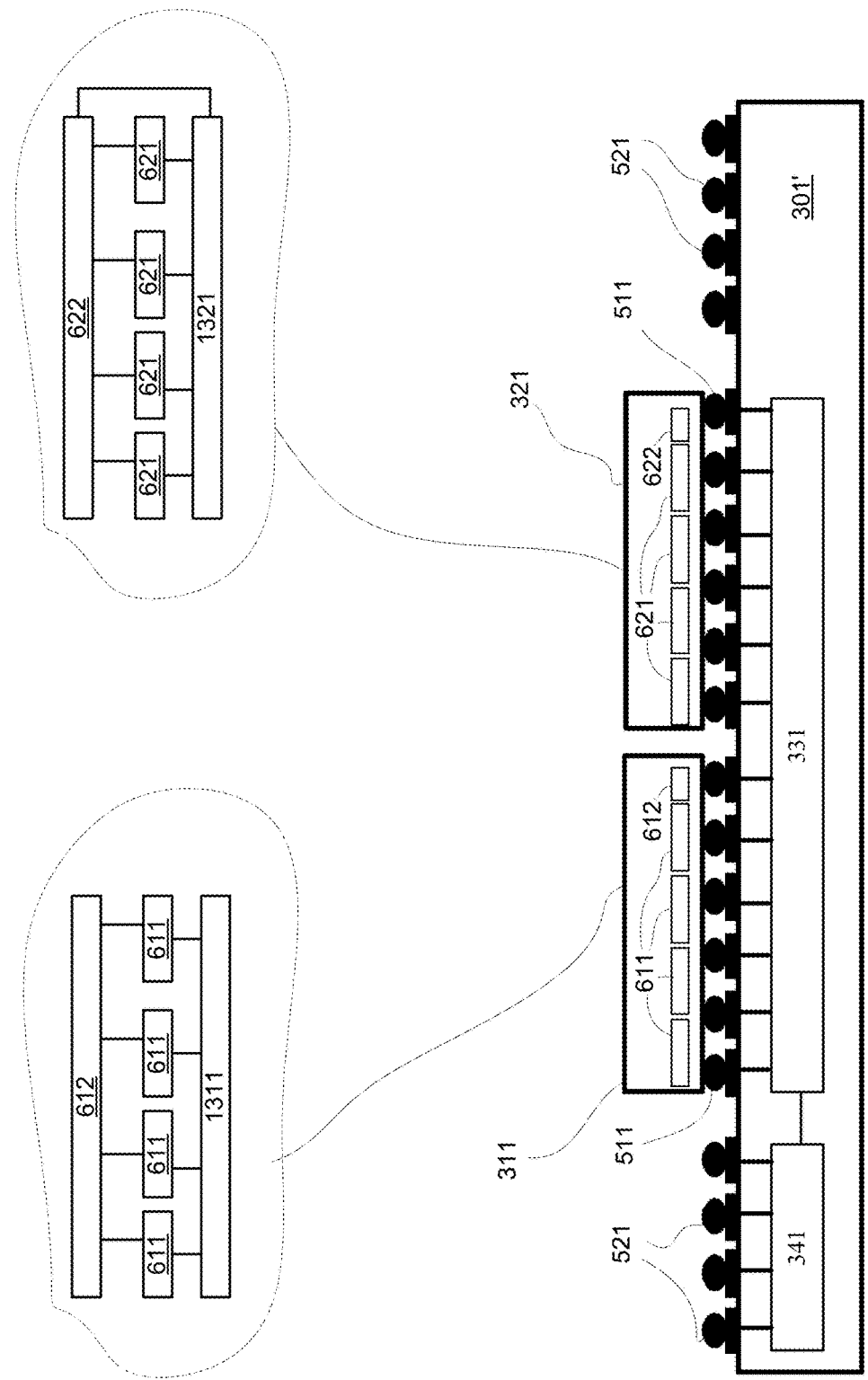
FIG. 7 is an example of a cross section of optoelectronic unit.

The electrical circuitry may be included an electrical IO interface chip (such as electrical IO interface chip 301' of FIG. 7).

The electrical IO interface chip may be a pure analog chip and may include only the high-frequency electrical IO interfaces and analog drivers for optical receive chip 321 and transmit chip 311. The high-frequency electrical IO interfaces may include the analog drivers.

Alternatively, the electrical IO interface chip may be a mixed signal chip with both digital and analog circuitries. One example of such digital circuitry is a digital signal processor that may perform error correction codes, improving the bit error rate of the optical signals and/or performing any task that is off-loaded from the first chip.

The analog drivers may be positioned exactly below the optical cells of the receive chip and/or the transmit chip.

For a transmit optical cell, the analog driver may include, for example, a clock data recovery, equalizer and modulator driver.

For a receive optical cell, the analog driver may include a TIA, limiting amplifier, CDR and equalizer.

In the case of a mixed signal electrical IO interface chip, a deserializer is required both at the chip edges for converting the 100 G traffic into digital streams and a serializer is required from each optical cell convert to/from digital to analog signal for the optical transmission/reception.

The serializer and the deserializer may form a SerDes. There may be additional electrical circuits (such as processors, filters, and the like) between the serializer and a deserializer.

Yet for another example, the electrical circuit may include a deserializer, one or more analog to digital conversion units, one or more digital processors, one or more digital to analog conversion unit and a serializer.

Assuming that the electrical circuitry is used for outputting signals from first chip 22 then:

a. The deserializer is configured to convert a stream of high-frequency output electrical signals to multiple streams of electrical signals of an intermediate frequency that is lower than the high-frequency of the stream of high-frequency output electrical signals.

b. The one or more analog to digital conversion units are configured to convert the multiple streams of electrical signals of intermediate frequency to multiple streams of digital signals.

c. The one or more digital processors are configured to digitally process the multiple streams of digital signals to provide multiple streams of digitally processed signals.

d. The one or more digital to analog conversion units are configured to convert the multiple streams of digitally processed signals to multiple streams of analog signals.

e. The serializer is configured to convert the analog signals to a stream of high-frequency analog signals that is fed to transmit chip.

Assuming that the electrical circuitry is used for inputting signals to first chip 22 then:

a. The deserializer is configured to convert a stream of high-frequency input electrical signals to multiple streams of electrical signals of the intermediate frequency.

b. The one or more analog to digital conversion units are configured to convert the multiple streams of electrical signals of intermediate frequency to multiple streams of digital signals.

c. The one or more digital processors are configured to digitally process the multiple streams of digital signals to provide multiple streams of digitally processed signals.

d. The one or more digital to analog conversion units are configured to convert the multiple streams of digitally processed signals to multiple streams of analog signals.

e. The serializer is configured to convert the analog signals to an input stream of high-frequency analog signals that is fed to first chip 22.

Optoelectronic units 301, 302, 303 and 304 and first chip 22 share substrate 20—and in this sense optoelectronic units 301, 302, 303 and 304, and first chip 22 are co-packaged.

FIG. 2 also illustrates pairs of fiber bundles 41.

Each pair of fiber bundle 41 is optically coupled to port 43 of line card 40, one fiber bundle of the pair is optically coupled to transmit chip (311, 312, 313 and 314, respectively) and another fiber bundle of the pair is optically coupled to a receive chip (321, 322, 323 and 324 respectively).

Ports 43 are coupled to optical fiber bundles 6 that are optically coupled to other entities.

Ports 43 may be passive fiber connectors that are located on the front panel 44 of line card 40—and are used to exchange high-frequency optical signals with fiber bundles 6.

It is noted that the substrate 20 may be designed to fit with the nature of the first chip and its number of layers, material and construct.

The high-frequency optoelectronic module 30 may include any number of first chips 22 (and these first chips may be the same and/or may differ from each other), any number of substrates and any number of optoelectronic chips. There may be any number of optical cells.

The high-frequency optoelectronic module 30 may manage (for example) a traffic of 25.6 Tb/s—whereas each optoelectronic unit manages one fourth of the overall traffic—6.4 Tb/s. The high frequency electrical and optical signals are 100 Gb/s signals.

Any other bandwidth and chip distribution among the device is acceptable.

Optoelectronic units 301-304 and first chip 22 may be fabricated using a CMOS process and/or any other manufacturing process.

The interfacing between substrate 20 and chips 22 and 301-304 may be done using any technique—such as but not limited to any bumping technology—especially such as micro copper bumps with underfill material dispensing between the chips and substrate.

Transmit chip 311 may include a two-dimensional matrix of transmit optical cells—or any arrangement of transmit optical cells.

Receive chip 321 may include a two-dimensional matrix of receive optical cells—or any arrangement of transmit optical cells.

The arrangement of transmit optical cells may be the same as the arrangement of the receive optical cells. Alternatively—the arrangement of transmit optical cells may differ from the arrangement of the receive optical cells The transmit chip 311 may include any arrangement (including a two-dimensional matrix) of vertical-cavity surface-emitting lasers (VCSEL). The receive chip may include any arrangement (including a two-dimensional matrix) of sensors such as p-i-n photodiodes The transmit chip 311 and/or the receive chip 321 may be Silicon Photonics (SiP) transmit and receive chips built from Silicon on Insulator (SOI). SiP is only an example of a type of circuitry that is included in the transmit chip 311 and/or the receive chip 321.

Using SiP and especially using single mode transmission (and single mode fibers) benefits from a range that may exceeds 1000 meters—which may be much longer to the range obtained when performing multimode transmission (and multimode fibers) using VCSEL (sub 100 meters range).

VCSEL when directly modulated at frequencies higher than 50 Gb/s do not behave well at high modulation frequencies and exhibit chirp that leads to chromatic dispersion.

Both receive chip 321 and transmit chip 311 may be assembled on the top surface of electrical IO chip 301' any assembling technique—for example using solder bumps made from Copper or SAC, for example.

Alignment of receive chip 321, transmit chip 311 and electrical IO chip 301' may be carried out using machine vision and alignment marks followed by reflow in a reducing environment to minimize oxidation.

In FIG. 2 the optoelectronic units surround the first chip. This is not necessarily so.

FIG. 2 illustrates optoelectronic units 301 and 302 that face one side of first chip 22, and optoelectronic units 303 and 304 that face an opposite side of first chip 22.

Figure 3:
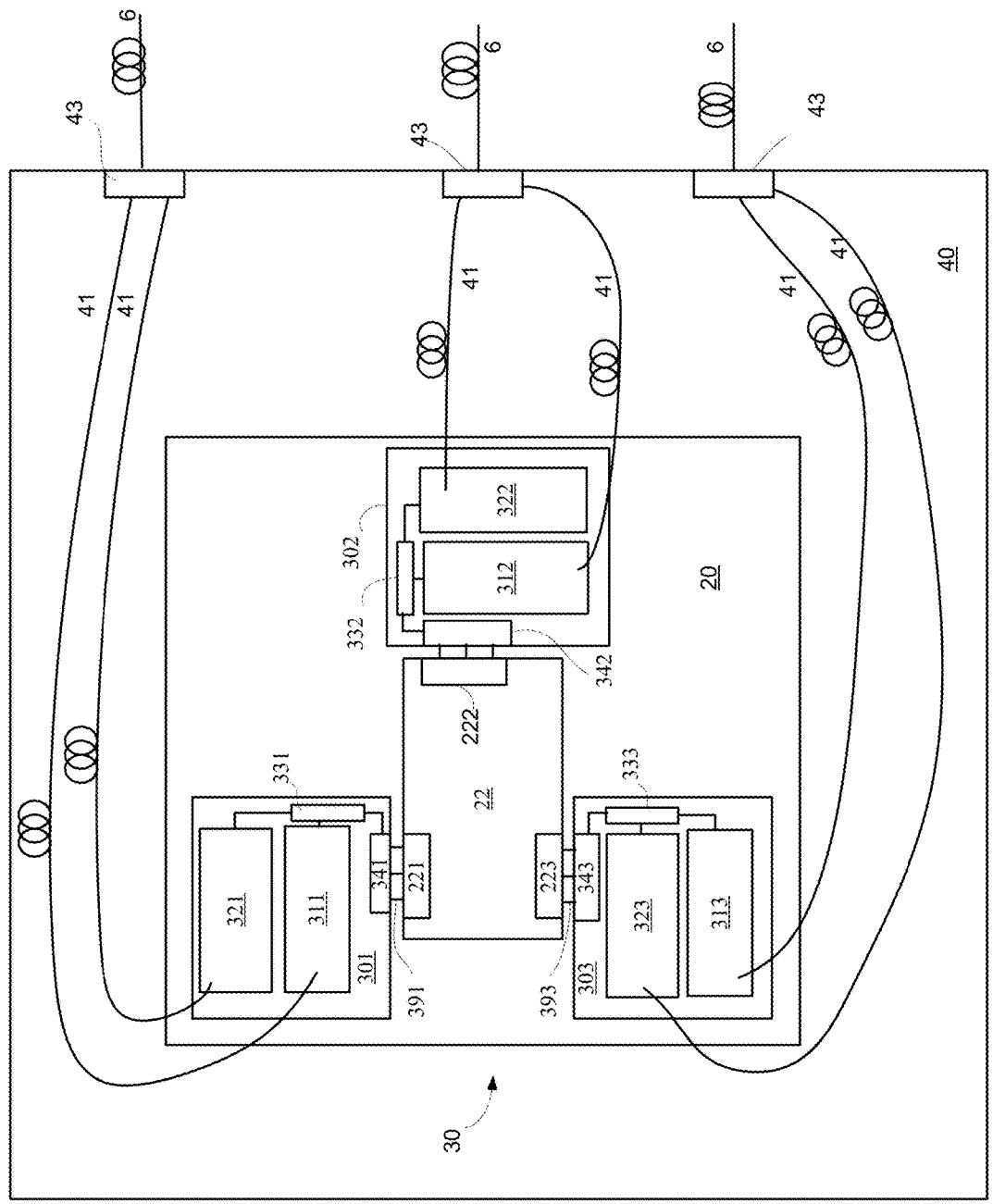
FIG. 3 illustrates an example of a line card.

FIG. 3 illustrates a high-frequency optoelectronic module 30 that includes first chip 22 and three optoelectronic units 301, 302 and 302 that face three different sides of first chip 22.

There may be any spatial relationship between the chips of the high-frequency optoelectronic module 30 as long as the conductors that convey high-frequency electrical signals between the chips are of a scale that does not exceed a millimetric scale.

While FIGS. 2 and 3 illustrates each optoelectronic unit as including a separate receiver chip and a separate transmitter chip—it should be noted that an optoelectronic unit may include a transmit/receive chip that performs both receive and transmit functions.

Figure 4:
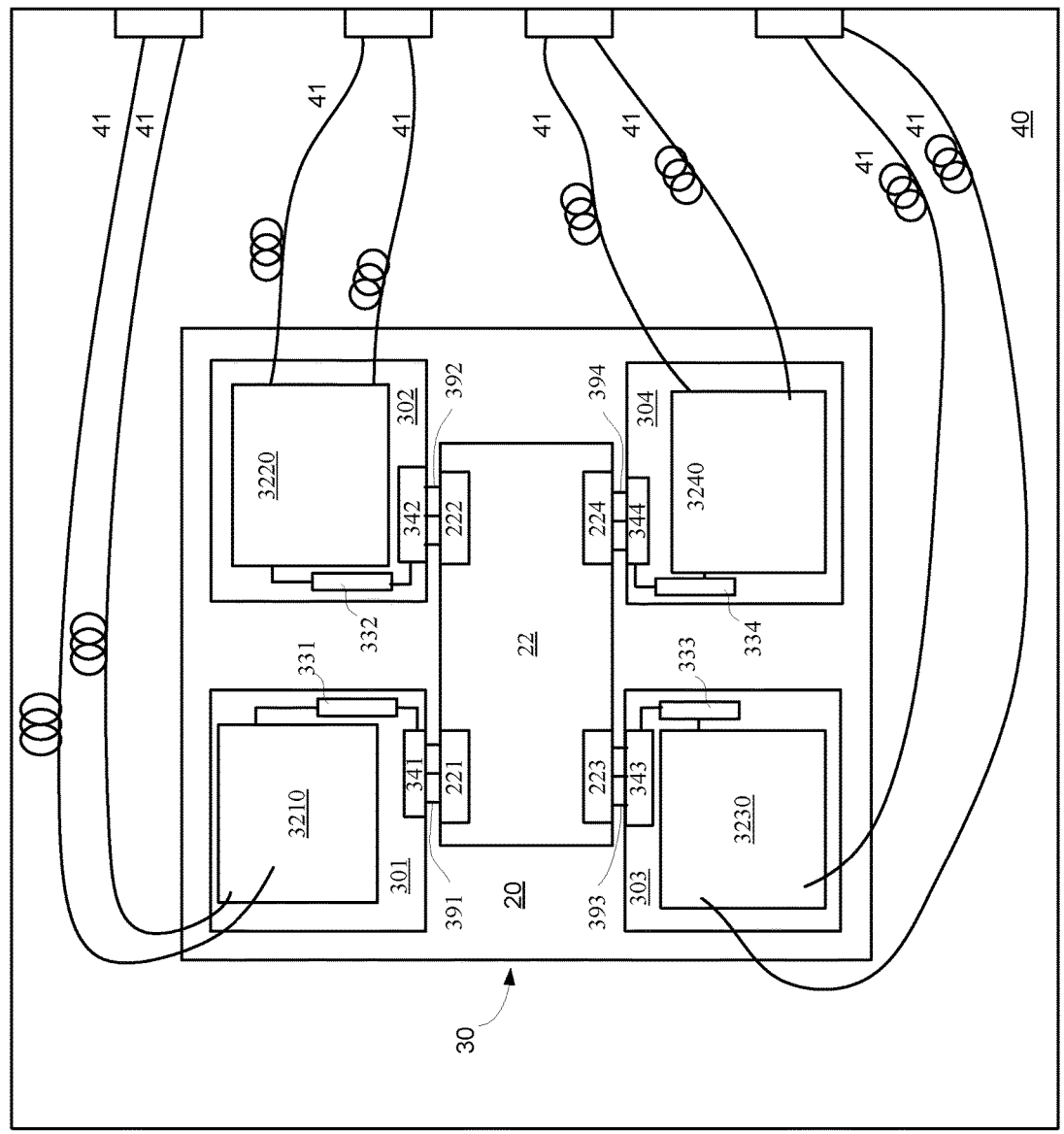
FIG. 4 illustrates an example of a line card.

FIG. 4 illustrates each optoelectronic unit (out of 301, 302, 303 and 304) as including transmit/receive chip (3210, 3220, 3230 and 3240 respectively).

FIGS. 2-4 illustrate a single substrate 20 that was coupled to the first chip 22 and the optoelectronic units 301-304. The number of substrates may differ from one. The substrate may provide mechanical support to the chips and may support the conductors between these chips.

Figure 5:
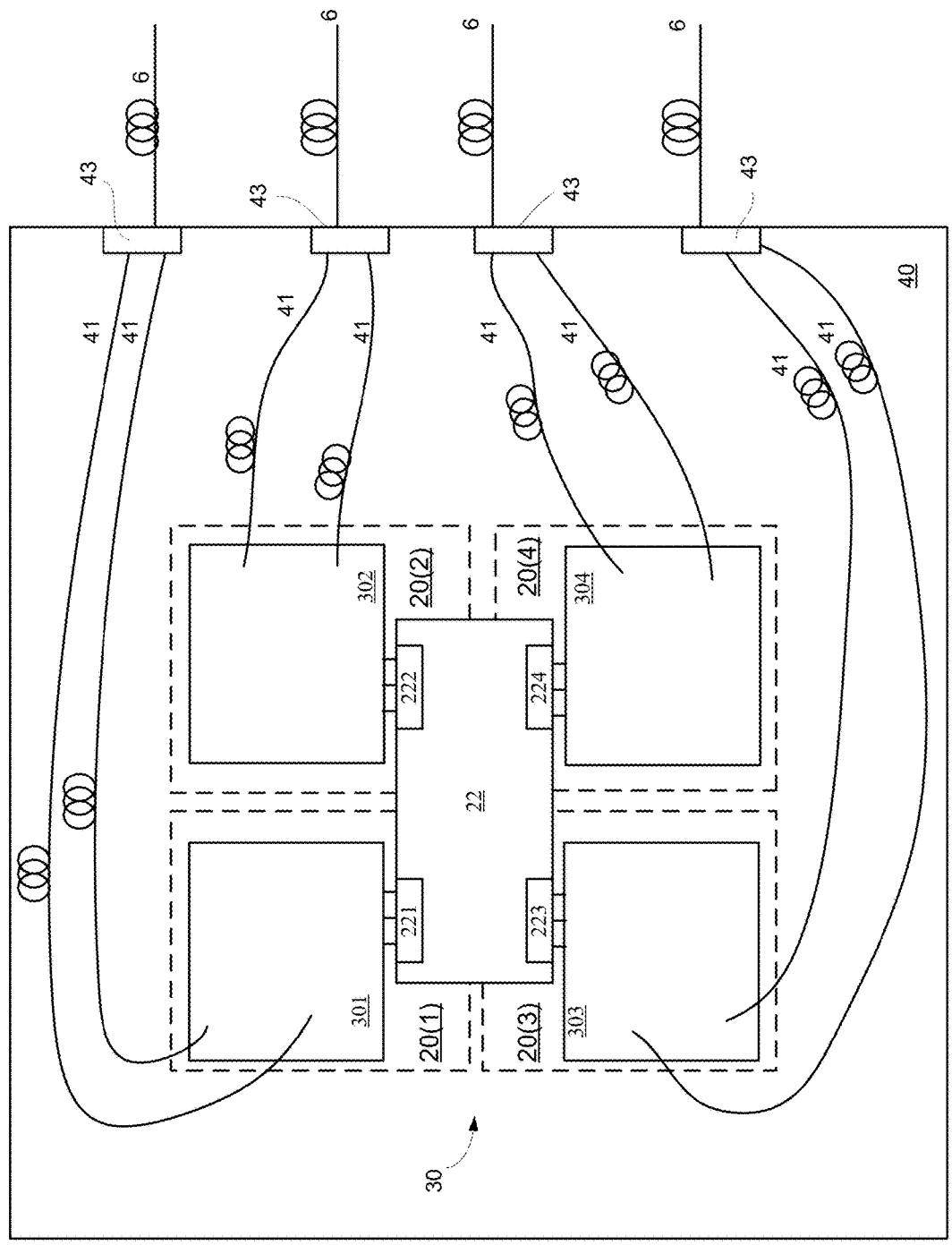
FIG. 5 illustrates an example of a line card.

FIG. 5 illustrates a high-frequency optoelectronic module 30 that includes substrates 20(1), 20(2), 20(3) and 20(4). Substrate 20(1) is coupled to first chip 22 and optoelectronic unit 301. Substrate 20(2) is coupled to first chip 22 and optoelectronic unit 302. Substrate 20(3) is coupled to first chip 22 and optoelectronic unit 303. Substrate 20(4) is coupled to first chip 22 and optoelectronic unit 304.

For simplicity of explanation few circuits of the optoelectronic units were omitted from FIG. 5.

Figure 6:
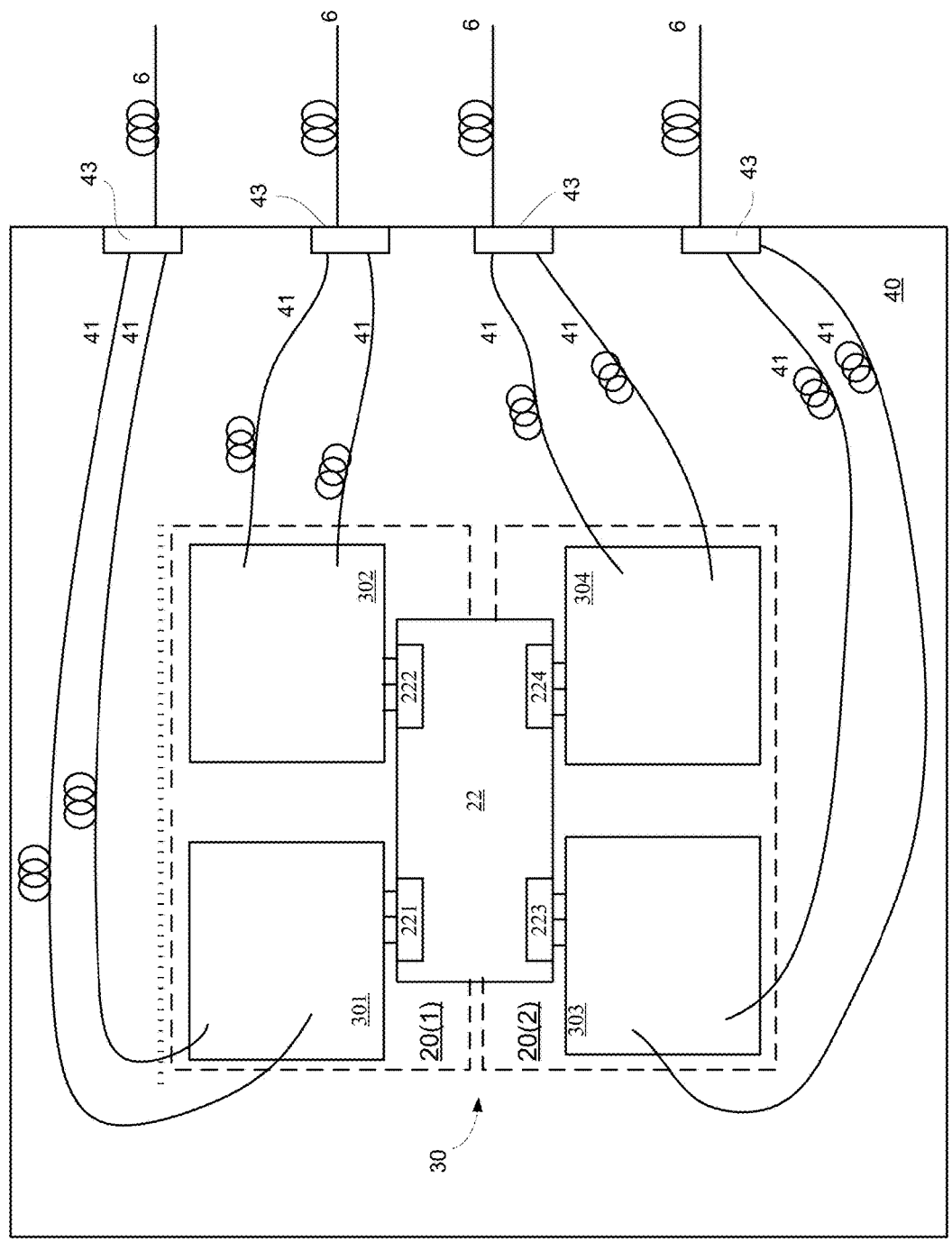
FIG. 6 illustrates an example of a line card.

FIG. 6 illustrates a high-frequency optoelectronic module 30 that includes substrates 20(1) and 20(2). Substrate 20(1) is coupled to first chip 22 and optoelectronic units 301 and 302. Substrate 20(2) is coupled to first chip 22 and optoelectronic units 303 and 304.

For simplicity of explanation few circuits of the optoelectronic units were omitted from FIG. 6.

FIG. 7 is an example of a cross section of optoelectronic unit 30.

The optoelectronic unit 30 may include an electrical portion that includes electrical circuitry such as high-frequency electrical IO interface 341 and additional circuitry 331.

The electrical portion may be included in electrical IO chip 301'.

The electrical IO chip 301' is coupled to transmit chip 311 and receive chip 321 in various manners—such as by conductive elements—especially by solder bumps 511.

Electrical IO chip 301' may be wider than both receive chip 321 and transmit chip 311—and includes a group of conducting elements (such as solder bumps 521) to enable coupling to the group of conducting elements to the set of high-frequency electrical IO interfaces of the first chip via substrate 20.

It should be noted that at least one of the conducting elements may be used to feed the optoelectronic unit 301 with supply signals and/or bias signals and/or ground from substrate 20.

Transmit chip 311 is illustrates as including transmit optical cells 611 and a multiplexer 612.

The transmit optical cells 611 and the multiplexer 612 belong to an active SiP layer of the transmit chip 311. The active SiP layer is located at the bottom of the transmit chip 311 when the transmit chip 311 is assembled with its bottom facing up.

FIG. 7 also illustrates a schematic connectivity between electrical circuitry 1311 and transmit optical cells 611. Electrical circuitry provides high-frequency electrical signals and/or control signals to transmit optical cells 611. Multiplexer 612 multiplexes the high-frequency modulated optical signals from several transmit optical cells 611 of a row and sends the multiplexed signal to an optical fiber 41.

Receive chip 321 is illustrated as including receive optical cells 621 and a demultiplexer 622.

The receive optical cells 621 and the demultiplexer 622 belong to an active SiP layer of the receive chip 321. The active SiP layer is located at the bottom of the receive chip 321 when the receive chip 321 is assembled with its bottom facing up.

FIG. 7 also illustrates a schematic connectivity between electrical circuitry 1321 and receive optical cells 621. Electrical circuitry 1321 connects to the optical receiver in receive cell 621 and provides control signals to receive optical cells 621. Demultiplexer 622 splits the incoming optical signal into several components that are routed to receive optical cells 621 and turn them to high frequency electrical signals.

Figure 8:
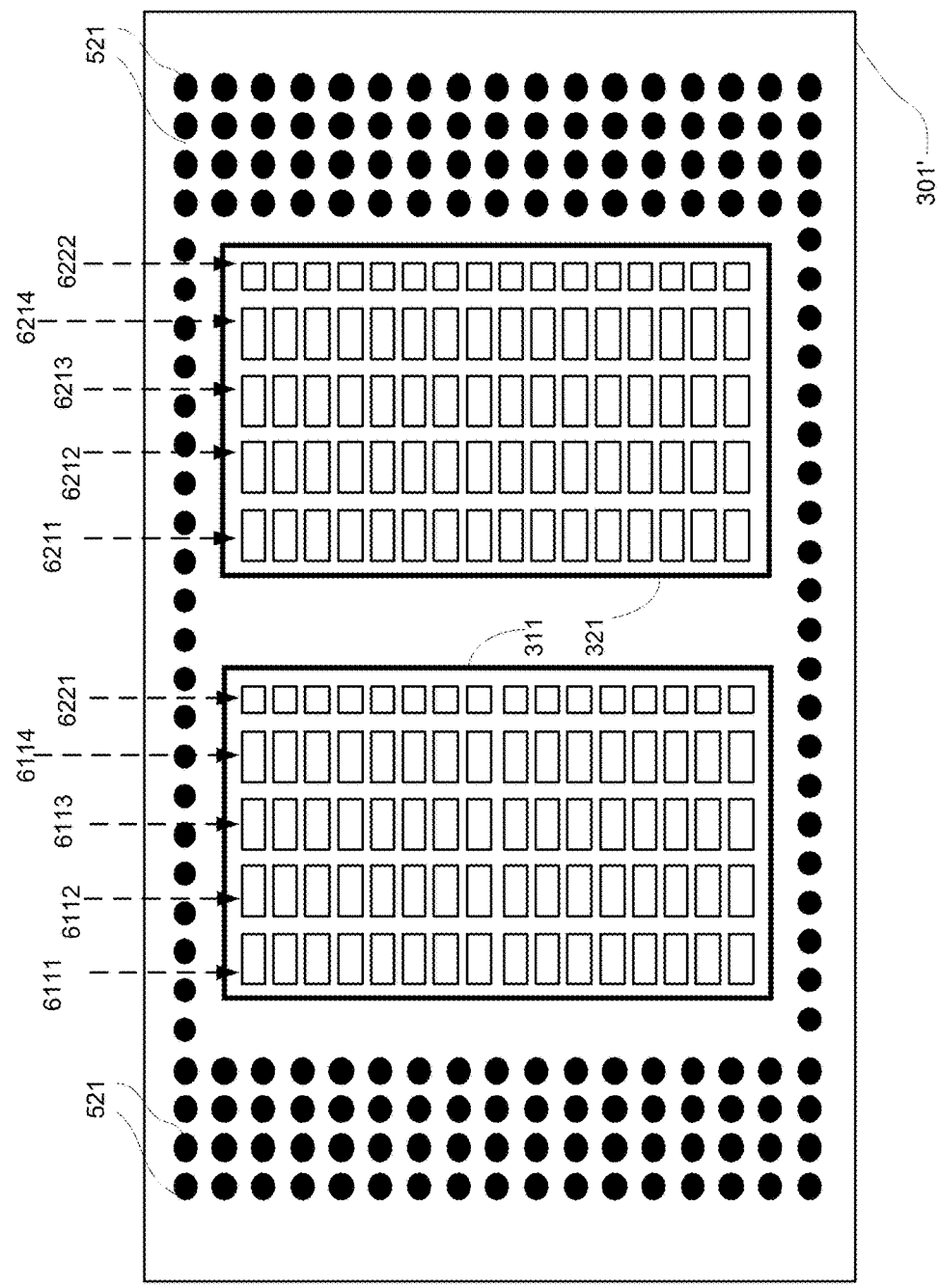
FIG. 8 is an example of a top view of optoelectronic unit.

FIG. 8 is an example of a top view of optoelectronic unit 301.

Optoelectronic unit 301 includes electrical IO chip 301', receive chip 321 and transmit chip 311.

Electrical IO chip 301' may include multiple conductors that are electrically coupled to conductive elements such as solder bumps 521. Solder bumps 511 are not shown in FIG. 8—because that are hidden by receive chip 321 and transmit chip 311.

The distance between receive chip 321 and transmit chip 311 may be small (for example below 1 millimeter) as dictated by the size of the electronic driver circuits 331 located below—but this is not necessarily so.

Solder bumps 521 surrounds the receive chip 321 and the transmit chip 311.

At least one of solder bumps 521 may be used to feed the optoelectronic unit 301 with supply signals and/or bias signals and/or ground from substrate 20.

FIG. 8 illustrates the receive chip 321 as including four columns (6211, 6212, 6213 and 6214) of receive optical cells (denoted 621 in FIG. 7) and one column 6222 of demultiplexers (denoted 622 in FIG. 7). There are sixteen rows and four columns to provide sixty-four receive optical cells and sixteen multiplexers—one de-multiplexer per row.

Each multiplexer may perform wavelength division multiplexing (WDM)—especially coarse WDM (CWDM). For example—every column of the matrix operates at one of the o-band wavelength with a 20 nm spacing 1270 nm, 1290 nm, 1310 nm and 1330 nm. Other wavelengths and other wavelength spacings may be used.

Receive chip 321 may be optically coupled to sixteen fibers—one fiber per multiplexer.

FIG. 8 illustrates the transmit chip 311 as including four columns (6111, 6112, 6113 and 6114) of transmit optical cells (denoted 611 in FIG. 7) and one column 6221 of—multiplexes (denoted 621 in FIG. 7). There are sixteen rows and four columns to provide sixty-four transmit optical cells and sixteen—multiplexers—one multiplexer per row.

Each multiplexer may perform wavelength division demultiplexing (WDM)—especially coarse WDM (CWDM). For example—every column of the matrix operates at one of the o-band wavelength with a 20 nm spacing 1270 nm, 1290 nm, 1310 nm and 1330 nm. Other wavelengths and other wavelength spacings may be used.

Transmit chip 311 may be optically coupled to sixteen fibers—one fiber per multiplexer.

It should be noted that any other arrangement of demultiplexers, multiplexers, transmit optical cells and receive optical cells may be provided. For example—column 6221 may be positioned between any columns out of 6111, 6112, 6113 and 6114—for example between columns 6112 and 6113. For example—column 6222 may be positioned between any columns out of 6211, 6212, 6213 and 6214—for example between columns 6212 and 6213.

Figure 9:
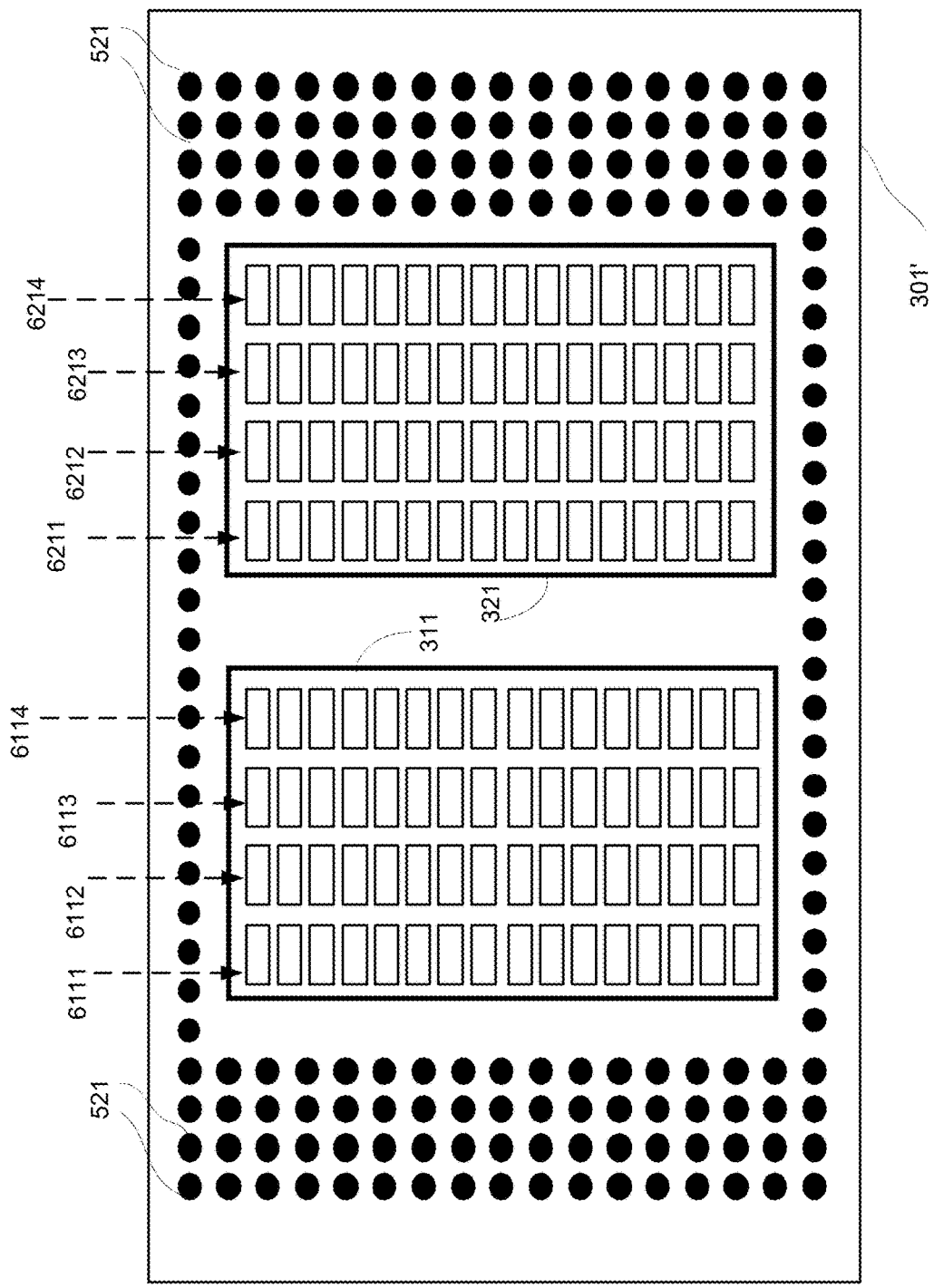
FIG. 9 is an example of a top view of optoelectronic unit.

FIG. 9 is an example of a top view of optoelectronic unit 301.

Optoelectronic unit 301 includes electrical IO chip 301', receive chip 321 and transmit chip 311.

Electrical IO chip 301' may include multiple conductors that are electrically coupled to conductive elements such as solder bumps 521. Solder bumps 511 are not shown in FIG. 9—because that are hidden by receive chip 321 and transmit chip 311.

The distance between receive chip 321 and transmit chip 311 may be small (for example below 1 millimeter)—but this is not necessarily so.

Solder bumps 521 surround the receive chip 321 and the transmit chip 311.

At least one of solder bumps 521 may be used to feed the optoelectronic unit 301 with supply signals and/or bias signals and/or ground from substrate 20.

FIG. 9 illustrates the receive chip 321 as including four columns 6211, 6212, 6213 and 6214 of receive optical cells (denoted 621 in FIG. 7)—without including demultiplexers. There are sixteen rows and four columns to provide sixty-four receive optical cells that are optically coupled to sixty-four fibers—fiber per receive optical cell.

FIG. 9 illustrates the transmit chip 311 as including four columns (6111, 6112, 6113 and 6114) of transmit optical cells (denoted 611 in FIG. 7) without including multiplexers. There are sixteen rows and four columns to provide sixty-four transmit optical cells that are optically coupled to sixty-four fibers—fiber per transmit optical cell.

When operating in parallel single mode (PSM) the wavelength of the transmit optical cells and/or the receive optical cells may be the same, may differ from each other—or may be a combination of both.

Figure 10:
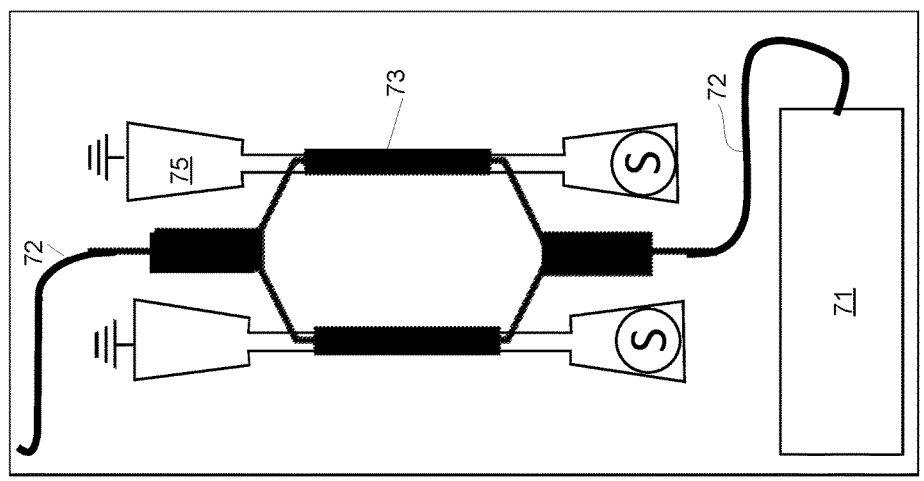
FIG. 10 illustrates an example of a transmit optical cell.

FIG. 10 illustrates a transmit optical cell. The transmit optical cell includes a laser such as a InP DFB laser 71 that is hybrid integrated on the transmit chip 311. Another configuration of assembling laser 71 may be to position it outside of transmit matrix 311 and to couple the light into the SiP using fibers and a coupling element such as a microlens and/or grating coupler. Laser 71, when placed outside of the matrix may be in the form of several large lasers of high optical power, coupled into the transmit matrix and distributed between the various rows using internal waveguide splitters.

The laser 71 is optically coupled with a waveguide 72 to a modulator 73 such as a Mach-Zehnder modulator. Other modulators, for example, electro-absorption may be used as well. Metallic electrodes 75, for example traveling wave electrodes, are deposited above the modulator to facilitate the coupling between a charge carrier and the optical beam.

The electrodes are connected to the 100 G modulation driver located exactly below cell 611 in the IO ASIC 30 with solder bumps 51 arranged in a high frequency layout such as GSGSG, for example.

The modulated signal can be routed with a waveguide either to a folding mirror 85 (FIG. 12) or to the mux cell 612 located at the edge of the matrix.

Figure 11:
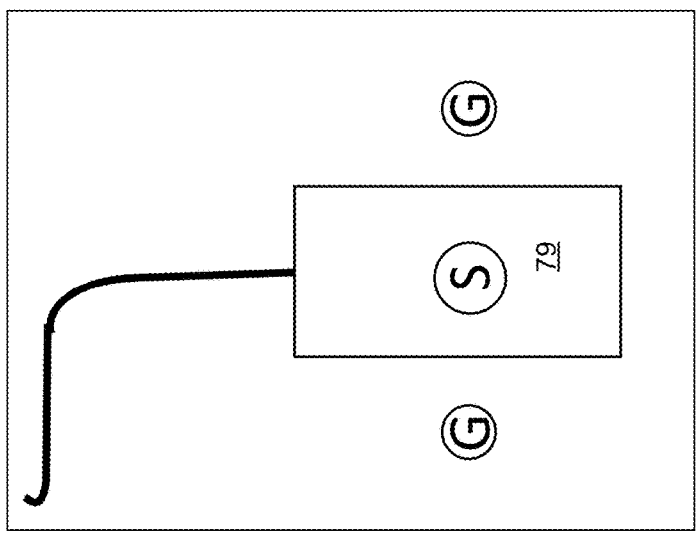
FIG. 11 illustrates an of a receive optical cell.

The receive optical cell 621 is shown in FIG. 11. The optical signal arriving from a de-mux filter in cell 622 (or from folding mirror 85 in the case of PSM operation) is routed to a Ge-based photodetector 79. The detector is connected to a transimpedance amplifier (TIA) located exactly below in IO ASIC 30 via solder bumps 511.

Figure 12:
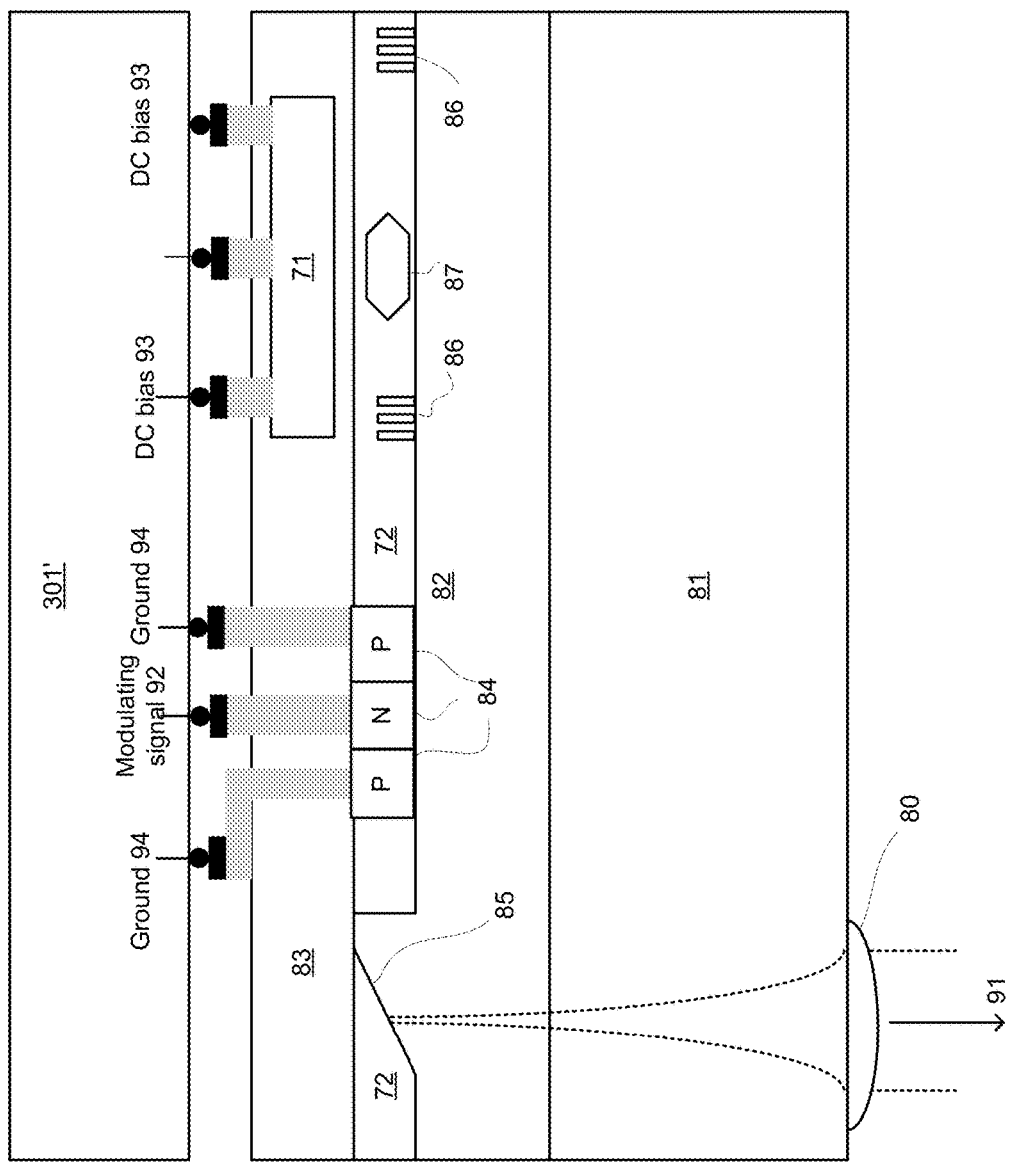
FIG. 12 is an example of a cross section of a transmit optical cell.

FIG. 12 is an example of a cross section of a transmit optical cell.

Light from laser 71 is coupled to the Silicon waveguide 72 using coupling elements such as taper 87 and diffraction grids 86 formed within waveguide 72. Other methods of coupling the laser light into the waveguide are possible as well. The light from the laser propagates along waveguide 72 and impinges on P-doped and N-doped regions 84 within modulator 84. The modulator is driven by high frequency modulating signal 94 connected to electrical circuit 301'.

The PN junction forms one arm of the MZ modulator, with signal and ground supplied to the junction via bumps. The PN junctions modulate the light to provide a modulated light that propagates to the left—and impinges on oriented mirror 85 formed in waveguide 72.

The oriented mirror 85 directs the modulated light beam downwards towards microlens 80. Mirror 85 is oriented in relation to waveguide 72 in any angle—for example a 45 degrees angle.

Microlens 80 can be made from Silicon to avoid thermal expansion differences. An optical grade thermosetting epoxy glue is used to mount the microlens to silicon substrate 81.

The light beam widens while propagating through the transmit optical cell and is collimated by microlens 80 to provide a high-frequency output optical signal 91 that is coupled to fiber 41 via a set of microlenses and right-angle prism or mirror.

Laser 71 is grounded (ground 94) and is fed by direct current (DC) bias signals 93.

Modulating signal 91, ground 94 and DC bias signal 93 are provided via interconnecting elements from electrical IO chip 301'.

The transmit optical cell includes silicon substrate 81 and buried oxide layer 82.

Layer 83 is also an oxide layer and is positioned above waveguide 72.

Figure 13:
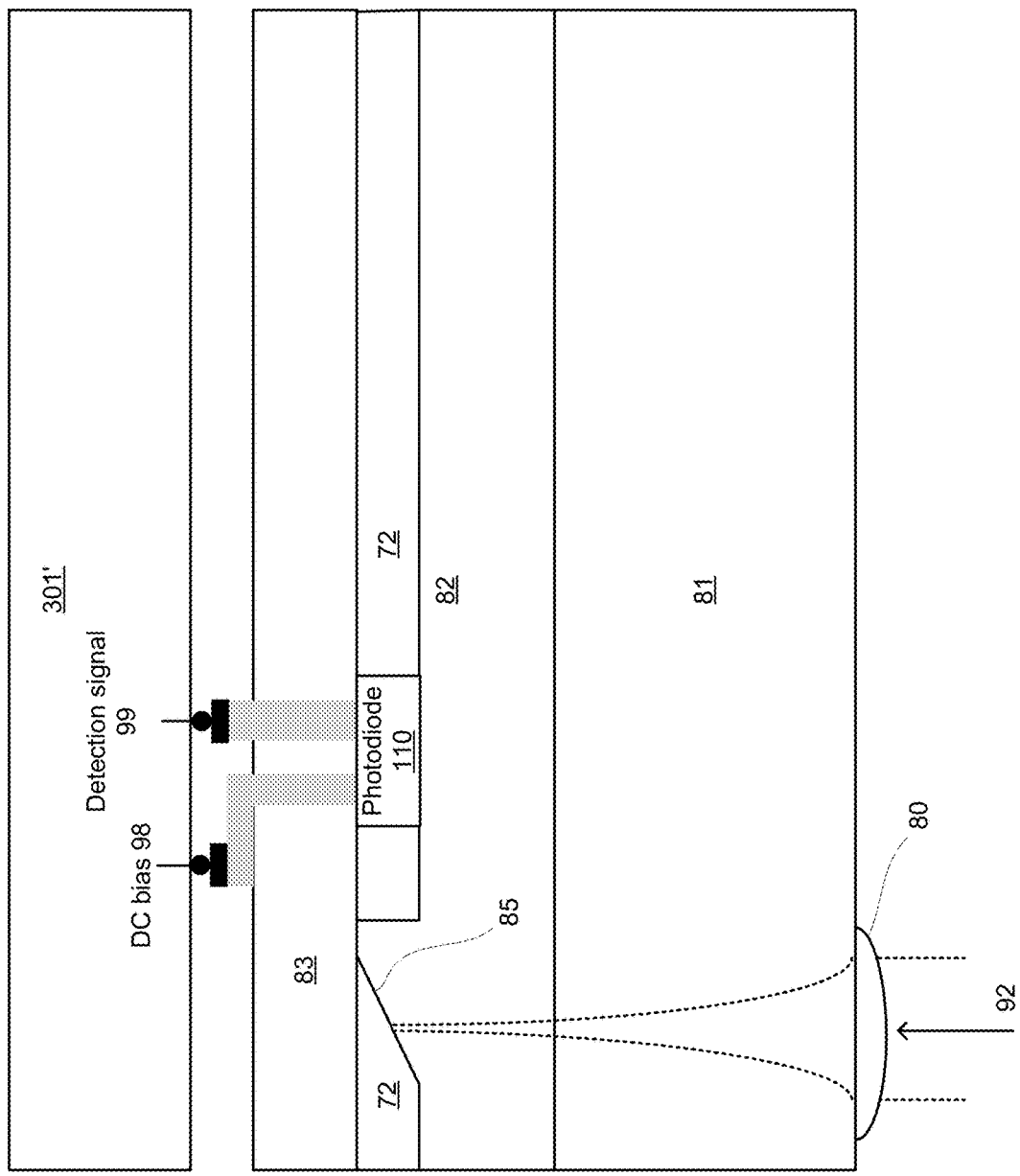
FIG. 13 is an example of a cross section of a receive optical cell.

FIG. 13 is an example of a cross section of a receive optical cell.

FIG. 13 illustrates a receive optical cell that operates in PSM—each fiber is optically coupled to a receive optical cell.

Light 92 from a fiber impinges on microlens 80 and propagates upwards, through substrate 81 and oxide layer 82 till impinging on oriented mirror 85 formed in waveguide 72. The oriented mirror 85 directs the light towards photodiode 110 formed in waveguide 72, for example, via epitaxial growth of Germanium in Silicon. Detected photocurrents 99 from the photodiode are directed to electrical IO chip 301'. The photodiode is fed by a DC bias 98 from electrical IO chip 301'.

Figure 14:
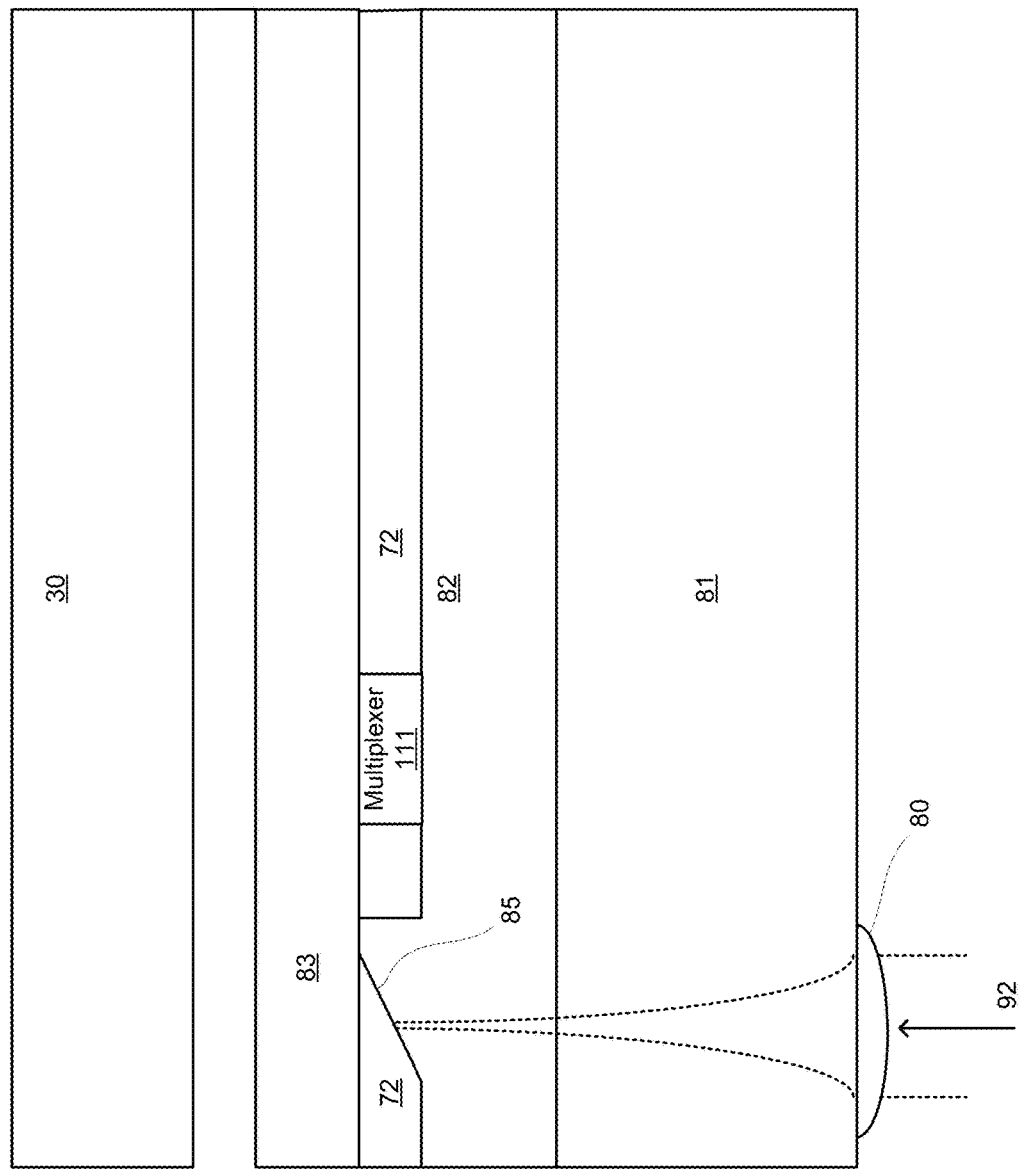
FIG. 14 is an example of a cross section of a portion of a row of a receive chip.

FIG. 14 is an example of a cross section of a portion of a row of a receive chip.

FIG. 14 illustrates a portion of a row of a receive chip that operates in CWDM—each fiber is optically coupled to a de-multiplexer that in turn is coupled to four optical receive cells.

Light 92 from a fiber impinges on microlens 80 and propagates through substrate 82 and oxide layer 82 till impinging on oriented mirror 85 formed in waveguide 72. The oriented mirror 85 directs the light towards de-multiplexer 111 formed in waveguide 72.

Figure 15:
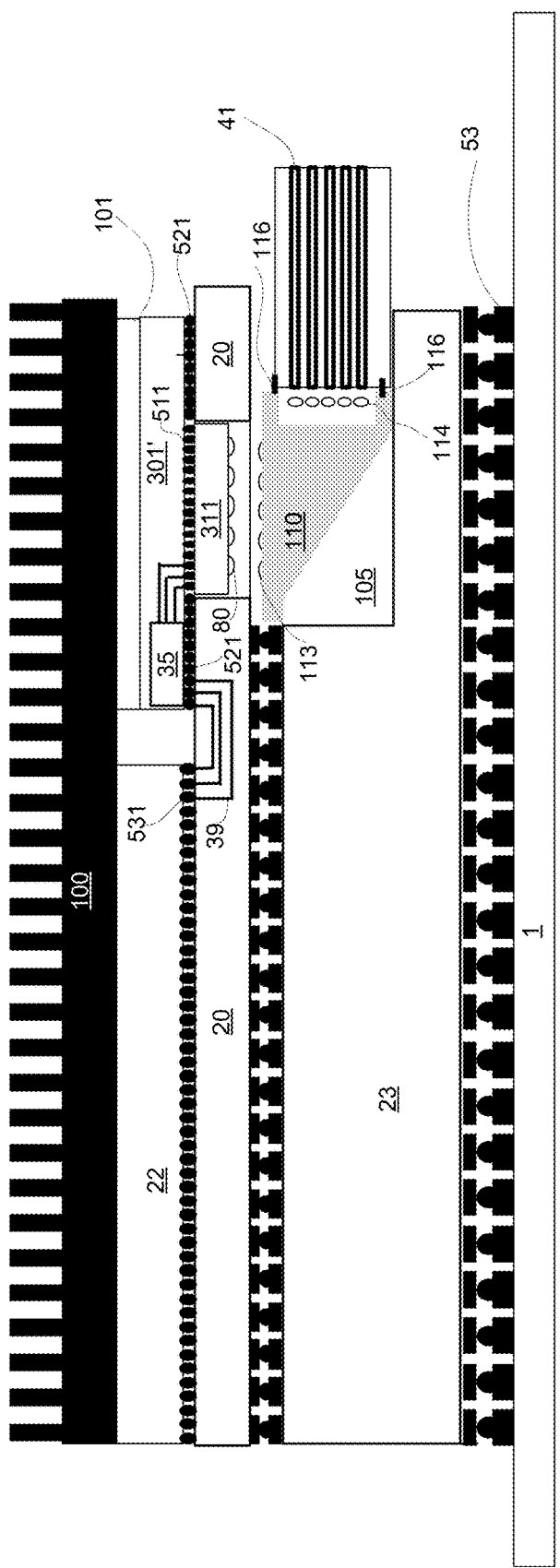
FIG. 15 is an example of a cross section of high-frequency optoelectronic module.

FIG. 15 is an example of a cross section of high-frequency optoelectronic module 30.

The high-frequency optoelectronic module 30 includes heat sink 100, first chip 22, substrate 20, conductors 39, electrical IO chip 301', electrical circuitry 35, transmit chip 311, microlenses 80, 113 and 114, electrical circuitry 35, spacer 23, thermal isolator 101, optical fibers 41, mechanical connector 116, a group of conducting elements such as solder bumps 521, a set of conducting elements such as solder bumps 531, solder bumps 511, additional conducting elements such as solder bumps 53, and gap 105.

Heat sink 100 is assembled on top of first chip 22 and is expected to dissipate the heat generated by first chip. The heat may be, for example, in the order of 400-500 Watts. The heat sink may also expand above electrical IO chip 301'. This may improve the heat dissipation capabilities of the heat sink given the air flow available Thermal insulator 101 is positioned between heat sink 100 and the electrical IO chip 301'. The thermal insulation assists in protecting the optoelectronic unit 301—and allowing to set the lasers of the transmit chip 311 at a desired temperature range—for example—at about 85 degrees Celsius while isolating it from the first chip junction temperature which can be as high as 125 degrees Celsius.

The transmit chip 311 faces downwards—and its microlenses 80 face a prism 110 with integrated microlens array 113 that is positioned in gap 105 formed in spacer 23. The prism 110 is aligned and glued onto spacer 23.

The transmit chip 311 may be positioned within a cutout hole formed in substrate 20.

Light from transmit chip 311 passes through microlenses 80, pass through microlenses 113, impinges on prism 110, directed by prism 110 (to the right)—towards microlenses 114 and fibers 41.

Optical coupling to fibers 41 is supported by expanding light beams from the transmit chip 311 and by an optical relay system that includes microlenses 80, 113 and 114. In addition, the hypotenuse surface of prism 110 can be made spherical and participate in the fiber coupling scheme.

Microlenses 80, 113 and 114 may be arranged in an array. Microlenses 80 may be flip chip assembled to transmit chip 311. Prism 110 and its associated microlens arrays 113 and 114 may be flip chip assembled and glued on spacer 23 using alignment marks.

When operating in PSM and without multiplexers there may be one fiber and one microlens from each one of the three microlens arrays per each transmit optical cell. For example—an array of 4×16 optical transmit cells may require an array of 4×16 microlenses 80, an array of 4×16 microlenses 113, an array of 4×16 microlenses 114 and 4×16 fibers 41.

When operating in CWDM and with multiplexers there may me one fiber and one microlens from each one of the three microlens arrays per each multiplexer. For example—sixteen multiplexers may require sixteen microlenses 80, sixteen microlenses 113, sixteen microlenses 114 and sixteen fibers 41.

For simplicity of explanation FIG. 15 illustrates only five fibers 41, five microlenses 113, five microlenses 114 and five microlenses 80.

Spacer 23 is used to allow sufficient space for the mechanical housing of the fiber coupler. The spacer 23 can be fabricated as a simple PCB or from any suitable material. Its thickness is determined by the required space between substrate 20 and line card 40. Spacer 23 may be mounted on line card 40 using connecting elements such as a standard BGA matrix 53. Other standard methods of assembly such piggyback connector or flexible socket may be used as well.

Conducting elements such as solder bumps 531, 521 and 511 are positioned at the same plane and are relatively close to each other—thereby reducing the distance that conductors 39 pass.

Some of conducting elements 531 are coupled to conductors 39 and form a set of conducting elements that are coupled to the set of high-frequency electrical IO interfaces of first chip 22. Some of conducting elements 521 form a group of conducting elements that are coupled to the group of high-frequency electrical IO interfaces of optoelectronic units 30.

Some other conducting elements may be used for feeding other signals and/or bias signals and/or commands between different chips.

Figure 16:
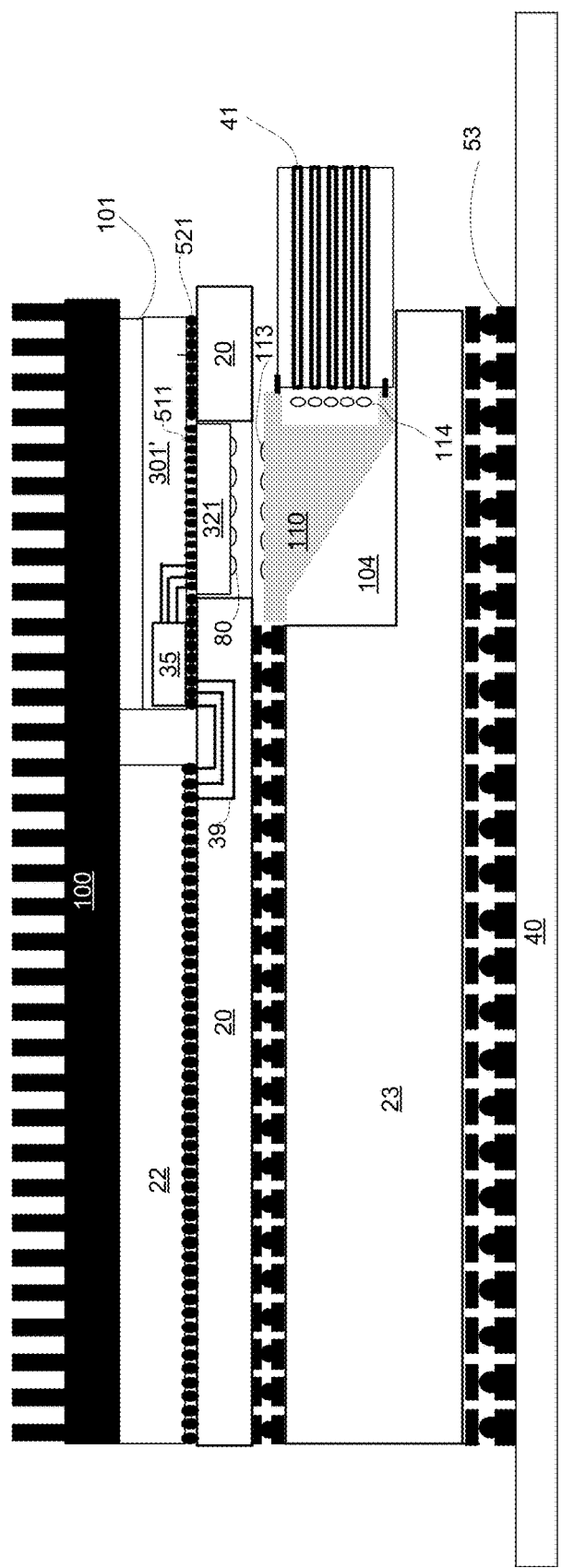
FIG. 16 is an example of a cross section of high-frequency optoelectronic module.

FIG. 16 is an example of a cross section of high-frequency optoelectronic module 30.

The high-frequency optoelectronic module 30 includes heat sink 100, first chip 22, substrate 20, conductors 39, electrical IO chip 301', electrical circuitry 35, receive chip 321, microlenses 80, 113 and 114, electrical circuitry 35, spacer 23, thermal isolator 101, optical fibers 41, mechanical connector 116, a group of conducting elements such as solder bumps 521, a set of conducting elements such as solder bumps 531, solder bumps 511, additional conducting elements such as solder bumps 53, and gap 105.

The receive chip 321 may be positioned within a cutout hole formed in substrate 20.

Light from fibers 41 passes through microlenses 114, impinge on prism 110, and directed by prism upwards— towards microlenses 80 and receive chip 321.

When operating in PSM and without multiplexers there may be one fiber and one microlens from each one of the three microlens arrays per each receive optical cell. For example—an array of 4×16 optical receive cells may require an array of 4×16 microlenses 80, an array of 4×16 microlenses 113, an array of 4×16 microlenses 114 and 4×16 fibers 41.

When operating in CWDM and with demultiplexers there may me one fiber and one microlens from each one of the three microlens arrays per each demultiplexer. For example—sixteen demultiplexers may require sixteen microlenses 80, sixteen microlenses 113, sixteen microlenses 114 and sixteen fibers 41.

For simplicity of explanation FIG. 16 illustrates only five fibers 41, five microlenses 113, five microlenses 114 and five microlenses 80.

Figure 17:
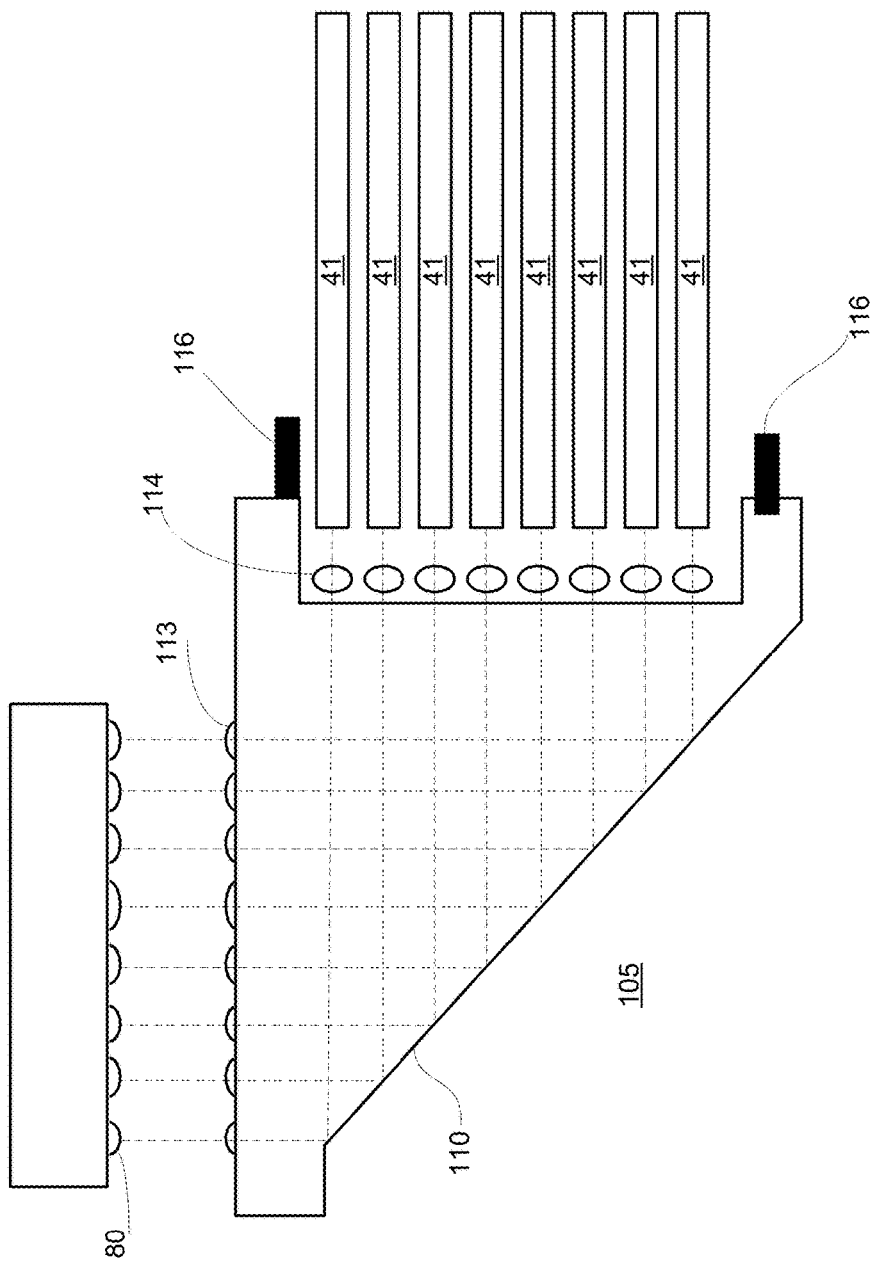
FIG. 17 illustrates optical paths between fibers, a prism and multiple microlenses.

FIG. 17 illustrates the optical paths (dashed lines) between fibers 41, microlenses 113, prism 110, microlenses 114 and microlenses 80.

Figure 18:
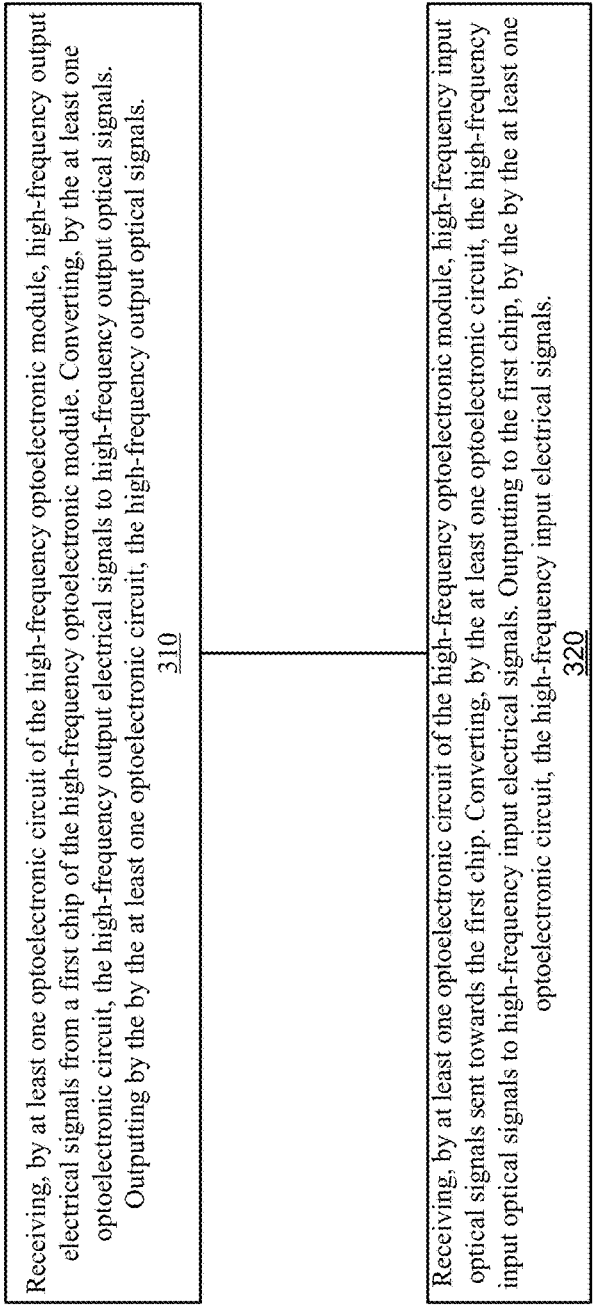
FIG. 18 illustrates an example of a method.

FIG. 18 illustrates an example of method 300.

Method 300 may include at least one step of steps 310 and 320.

Step 310 may include (a) receiving, by at least one optoelectronic circuit of the high-frequency optoelectronic module, high-frequency output electrical signals from a first chip of the high-frequency optoelectronic module; (b) converting, by the at least one optoelectronic circuit, the high-frequency output electrical signals to high-frequency output optical signals; and (c) outputting by the by the at least one optoelectronic circuit, the high-frequency output optical signals.

Step 320 may include (a) receiving, by at least one optoelectronic circuit of the high-frequency optoelectronic module, high-frequency input optical signals sent towards the first chip; (b) converting, by the at least one optoelectronic circuit, the high-frequency input optical signals to high-frequency input electrical signals; and (c) outputting to the first chip, by the by the at least one optoelectronic circuit, the high-frequency input electrical signals.

The first chip may include a set of high-frequency electrical input/output (IO) interfaces. The at least one optoelectronic unit comprises a group of high-frequency electrical IO interfaces and a group of high-frequency optical IO interfaces. The group of high-frequency optical IO interfaces is coupled to the group of high-frequency electrical IO interfaces; wherein the high-frequency optoelectronic module comprises a substrate that is coupled to the first chip and the at least one optoelectronic chip; wherein the set of high-frequency electrical IO interfaces is coupled to the group of high-frequency electrical IO interfaces via a group of conductors; wherein a length of each conductor of the group of conductors is of a scale that does not exceed a millimetric scale; wherein the high-frequency is not smaller than one hundred gigabits per second. Any exchange of signals between the set of high-frequency electrical IO interfaces and the group of high-frequency electrical IO interfaces can be done via the group of conductors. Any conductor may be used for bi-directional and/or unidirectional communication.

Step 310 may include receiving, by analog circuitry of the at least one optoelectronic circuit, the high-frequency output electrical signals; manipulating, by the analog circuitry, the high-frequency output electrical signals in the analog domain to provide manipulated high-frequency output electrical signals; providing, by the analog circuitry, the manipulated high-frequency output electrical signals to an optical circuitry of by the at least one optoelectronic circuit; and outputting, by the optical circuitry, the high-frequency output optical signals in response to the manipulated high-frequency output electrical signals. Step 320 may include an analogues step.

The at least one optoelectronic unit may include a deserializer, analog to digital conversion unit, a digital processor, a digital to analog conversion unit, a serializer, and optical circuitry.

Step 310 may include converting, by the serializer, a stream of high-frequency output electrical signals to multiple streams of electrical signals of an intermediate frequency that is lower than a high-frequency of the stream of high-frequency output electrical signals; converting, by the analog to digital conversion unit, the multiple streams of electrical signals of an intermediate frequency to multiple streams of digital signals; processing, by the digital processor, the multiple streams of digital signals to provide multiple streams of digitally processed signals; converting, by the digital to analog conversion unit, the multiple streams of digitally processed signals to multiple streams of analog signals; converting, by the serializer, the analog signals to a stream of high-frequency analog signals; and converting by the optical circuitry, the stream of high-frequency analog signals to a stream of high-frequency optical signals. Step 320 may include an analogues step.

The terms "including", "comprising", "having", "consisting" and "consisting essentially of" are used in an interchangeable manner. For example—any module or chip may include at least the components included in the figures and/or in the specification, only the components included in the figures and/or the specification.

Any reference to the phrases "may" or "may be" should be applied to the phrases "may not" or "may not be".

The phrase "and/or" means additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between blocks are merely illustrative and that alternative embodiments may merge blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A high-frequency optoelectronic module, comprising:
a first chip that comprises a set of high-frequency electrical input/output (IO) interfaces;
an optoelectronic unit that comprises a high-frequency electrical IO chip, a group of high-frequency electrical IO interfaces, and a high-frequency optical transmit chip;
a substrate that is (a) coupled, via the set of high-frequency electrical IO interfaces to the first chip, and is (b) coupled, via the group of high-frequency electrical IO interfaces to the high-frequency electrical IO chip;
wherein the high-frequency optical transmit chip is positioned within a hole formed in the substrate and is configured to transmit high-frequency optical signals away from the high-frequency electrical IO chip;
wherein the set of high-frequency electrical IO interfaces is coupled to the group of high-frequency electrical IO interfaces via a group of conductors;
wherein a length of each conductor of the group of conductors is of a scale that does not exceed a millimetric scale;
wherein the optoelectronic unit is configured to convert high-frequency output electrical signals from the first chip to high-frequency output optical signals.

2. The high-frequency optoelectronic module according to claim 1, wherein at least one conductor of the group of conductors passes through the substrate.

3. The high-frequency optoelectronic module according to claim 1, wherein the substrate is coupled to the group of high-frequency electrical IO interfaces via a group of conducting elements; wherein the substrate is coupled to the set of high-frequency electrical IO interfaces via a set of conducting elements; wherein the group of conducting elements and the set of conducting elements are positioned at a same plane.

4. The high-frequency optoelectronic module according to claim 3, wherein the high-frequency electrical IO chip is coupled to the high-frequency optical transmit chip via multiple conducting elements, and wherein the multiple conducting elements, the group of conducting elements and the set of conducting elements are located at the same plane.

5. The high-frequency optoelectronic module according to claim 1, wherein the substrate is coupled to the group of high-frequency electrical IO interfaces via a group of conducting elements; wherein the substrate is coupled to the set of high-frequency electrical IO interfaces via a set of conducting elements; wherein a minimal distance between a conducting element of the group of conducting elements and a conducting element of the set of conducting elements is of a scale that does not exceed a millimetric scale.

6. The high-frequency optoelectronic module according to claim 1 comprising an additional optoelectronic unit that comprises an additional high-frequency electrical IO chip, and a high-frequency optical receive chip; wherein the high-frequency optical receive chip is located in either one of (a) the holed formed in the substrate or (b) another hole formed in the substrate.

7. The high-frequency optoelectronic module according to claim 6 wherein the substrate is coupled, via an additional group of high-frequency electrical IO interfaces to the additional high-frequency electrical IO chip.

8. The high-frequency optoelectronic module according to claim 6, wherein at least one conductor of the additional group of conductors passes through the substrate.

9. The high-frequency optoelectronic module according to claim 6, wherein the substrate is coupled to the additional group of high-frequency electrical IO interfaces via an additional group of conducting elements; wherein the substrate is coupled to the additional set of high-frequency electrical IO interfaces via an additional set of conducting elements; wherein the additional group of conducting elements is located at a certain plane and the additional set of conducting elements is positioned at the certain plane.

10. The high-frequency optoelectronic module according to claim 9, wherein the additional high-frequency electrical IO chip is coupled to the high-frequency optical receive chip via additional multiple conducting elements, and wherein the additional multiple conducting elements, the additional group of conducting elements and the additional set of conducting elements are located at the certain plane.

11. The high-frequency optoelectronic module according to claim 1 comprising line card connectors and an optical connector that is configured to receive fibers; wherein the optical connector is positioned between the substrate and the line card connectors.

12. The high-frequency optoelectronic module according to claim 11, comprising a spacer that is positioned below the substrate and is configured to support the mechanical connector.

13. The high-frequency optoelectronic module according to claim 1 comprising an optical prism and a mechanical connector for receiving fibers; wherein the substrate is positioned between (a) the first chip and the high-frequency electrical IO chip, and (b) the optical prism and the mechanical connector.

14. The high-frequency optoelectronic module according to claim 13, wherein a top surface of the high-frequency optical transmit chip is located at a same height as a top surface of the substrate.

15. The high-frequency optoelectronic module according to claim 1 comprising a heat sink and a thermal isolator; wherein the heat sink is thermally coupled to one side of thermal insulator and to the first chip; wherein a second side of the thermal isolator is thermally coupled to the high-frequency electrical IO chip.

16. The high-frequency optoelectronic module according to claim 1 wherein the substrate is a non-organic substrate.

17. A method for exchanging high-frequency optical signals, the method comprises:
   outputting, from a first chip that comprises a set of high-frequency electrical input/output (IO) interfaces, high-frequency output electrical signals; and
   converting the high-frequency output electrical signals to high-frequency output optical signals and transmitting the high-frequency output optical signals, by an optoelectronic unit that comprises a high-frequency electrical IO chip, a group of high-frequency electrical IO interfaces, and a high-frequency optical transmit chip;
   wherein the first chip and the optoelectronic unit belong to a high-frequency optoelectronic module that further comprises: a substrate that is (a) coupled, via the set of high-frequency electrical IO interfaces to the first chip, and is (b) coupled, via the group of high-frequency electrical IO interfaces to the high-frequency electrical IO chip; wherein the high-frequency optical transmit chip is positioned within a hole formed in the substrate; wherein the set of high-frequency electrical IO interfaces is coupled to the group of high-frequency electrical IO interfaces via a group of conductors; wherein a length of each conductor of the group of conductors is of a scale that does not exceed a millimetric scale; and
   wherein the transmitting of the high-frequency output optical signals comprises transmitting the high-frequency output optical signals by the high-frequency optical transmit chip away from the first chip.

18. The method according to claim 17, comprising receiving high-frequency input optical signals, by a high-frequency optical receive chip of an additional optoelectronic unit of the high-frequency optoelectronic module; converting, by the additional optoelectronic unit, the high-frequency input optical signals to high-frequency input electrical signals; and sending the high-frequency input electrical signals to the first chip; and wherein the high-frequency optical recieve chip is located in either one of (a) the holed formed in the substrate or (b) another hole formed in the substrate.

* * * * *